United States Patent [19]

Becker

[11] Patent Number: 4,713,081

[45] Date of Patent: Dec. 15, 1987

[54] STABLE AQUEOUS DYESTUFF PREPARATIONS OF FINELY DISPERSED WATER-INSOLUBLE OR SPARINGLY WATER-SOLUBLE DYES

[75] Inventor: Carl Becker, Basel, Switzerland

[73] Assignee: Ciba-Geigy Corporation, Ardsley, N.Y.

[21] Appl. No.: 32,431

[22] Filed: Apr. 23, 1979

Related U.S. Application Data

[63] Continuation-in-part of Ser. No. 917,709, Jun. 21, 1978, abandoned.

[30] Foreign Application Priority Data

Nov. 23, 1977 [CH] Switzerland ............................ 14346

[51] Int. Cl.$^4$ .................... B41M 5/26; D06P 1/22; D06P 3/54; C09K 11/06
[52] U.S. Cl. ............................................. 8/527; 8/471; 8/528; 8/557; 8/558; 8/589; 8/609; 8/611; 8/650
[58] Field of Search ........................... 8/471, 527, 557

[56] References Cited

U.S. PATENT DOCUMENTS

| 3,277,162 | 10/1966 | Johnson | 8/89 |
|---|---|---|---|
| 3,802,905 | 4/1974 | Beyer et al. | 8/552 |
| 3,830,627 | 8/1974 | Dacuble et al. | 8/92 |
| 3,960,486 | 6/1976 | Daubach et al. | 8/524 |
| 3,963,432 | 6/1976 | Hauxwell et al. | 8/93 |
| 3,977,828 | 8/1976 | Becker et al. | 8/79 |
| 4,042,320 | 8/1977 | Becker et al. | 8/524 |
| 4,094,634 | 6/1978 | Becker et al. | 8/470 |
| 4,095,942 | 6/1978 | Dellian et al. | 8/173 |
| 4,115,457 | 9/1978 | Wiedemann | 8/173 |
| 4,131,564 | 12/1978 | Dilling | 8/89 R |
| 4,132,525 | 1/1979 | Berger et al. | 8/89 R |
| 4,225,311 | 9/1980 | Niimi et al. | 8/524 |

FOREIGN PATENT DOCUMENTS

| 845953 | 3/1977 | Belgium . | |
|---|---|---|---|
| 2414455 | 10/1975 | Fed. Rep. of Germany . | |
| 2323435 | 4/1977 | France . | |
| 49-66975 | 6/1974 | Japan | 8/62 |
| 1339680 | 12/1973 | United Kingdom . | |
| 1468877 | 3/1977 | United Kingdom . | |
| 1551829 | 9/1979 | United Kingdom . | |

*Primary Examiner*—A. Lionel Clingman
*Attorney, Agent, or Firm*—Edward McC. Roberts; Joseph G. Kolodny

[57] ABSTRACT

The invention provides aqueous dyestuff preparations of water-insoluble or sparingly water-soluble dyes which may be used for preparing printing pastes to be used for printing textile material as well as for printing supports for transfer printing. The preparations contain at least 10% by weight of water, 10 to 60% by weight of a finely dispersed water-insoluble or sparingly water-soluble dye, 0.1 to 5% by weight of at least one anionic dispersant, and 0.5 to 5% by weight of a non-ionic copolymer of ethylene oxide and a further olefin oxide, said copolymer having an ethylene oxide content of at least 65% by weight and a molecular weight of more than 12,000, and also, if desired, further ingredients.

46 Claims, No Drawings

STABLE AQUEOUS DYESTUFF PREPARATIONS OF FINELY DISPERSED WATER-INSOLUBLE OR SPARINGLY WATER-SOLUBLE DYES

The invention relates to novel aqueous dyestuff preparations of water-insoluble or sparingly water-soluble dyes, a process for the production of said dyestuff preparations, the use thereof for preparing printing pastes and the use thereof for printing supports for transfer printing, for printing textile material in particular or for dyeing textile material and also to the printed supports and the material printed by transfer printing or dyed or printed by a dyeing or printing process by means of these dyestuff preparations.

Water-insoluble or sparingly water-soluble dyes are available commercially both as liquid formulations and as powder formulations. The latter have the disadvantage that they have to be dispersed in water before they are applied. The known liquid formulations have the disadvantage that they usually contain large amounts, usually more than 30% by weight, of dispersants, and only about 20% by weight of dye.

It is known from German Offenlegungsschrift No. 2,520,527 that liquid dye preparations which have a high dye concentration and are stable on storage can be prepared when selected anionic dispersants are used together with non-ionic dispersants and hydrotropic agents, especially urea.

However, the use of hydrotropic agents in many cases has attendant disadvantages. Preparations which contain ionic hydrotropic agents cannot be used in electrolyte-sensitive application media, for example in those which contain polyacrylate thickeners, because their electrolyte content is too high. Preparations which contain urea as the hydrotropic agent undergo a change in the pH value on prolonged storage; this change results from the elimination of ammonia and can lead to partial decomposition in the case of alkali-sensitive dyes. Moreover, additional electrolyte is formed as a result of the elimination of ammonia. In the presence of urea there is also the danger with many thickeners that these will become brown or harden, so that they can be washed out only with difficulty. Moreover, owing to the evolution of ammonia, a dangerous excess pressure can arise in the heretically sealed vessels in which the preparations are stored.

It has now been found that the stability of the dyestuff preparations of German Offenlegungsschrift No. 2,520,527 can be further markedly improved by using, as non-ionic dispersants, selected copolymers of ethylene oxide and a further olefin oxide, which have a molecular weight of more than 12,000 and in which the ethylene oxide content amounts to at least 65% by weight. Surprisingly, when using these non-ionic dispersants, the addition of a hydrotropic agent is not necessary and the disadvantages caused by these agents no longer arise.

Accordingly, the present invention provides novel aqueous dyestuff preparations of water-insoluble or sparingly water-soluble dyes having a particle size of less than $10\mu$ and especially of less than $2\mu$, which contain at least 10% by weight of water, 10 to 60% by weight, preferably 25 to 60% by weight, of a finely dispersed water-insoluble or sparingly water-soluble dye, 0.1 to 5% by weight of at least one anionic dispersant and 0.5 to 5% by weight of a non-ionic copolymer of ethylene oxide and a further olefin oxide, said copolymer having an ethylene oxide content of at least 65% by weight and a molecular weight of more than 12,000, and also if desired further Eligible water-insoluble or sparingly water-soluble dyes are, in particular, disperse dyes and vat dyes. The dyes belong to various classes, the disperse dyes being, for example, nitro dyes, aminoketone dyes, ketone-imine dyes, methine dyes, nitrodiphenylamine dyes, quinoline dyes, aminonaphthoquinone dyes, coumarin dyes and especially anthraquinone dyes and azo dyes, such as monoazo and disazo dyes.

Vat dyes are, for example, indigoid dyes, anthraquinonoid dyes, for example indanthrene, and also sulphur dyes and leuco vat dye esters.

Dyes are also to be understood as comprising fluorescent whitening agents. The latter are, for example, fluorescent whitening agents which are water-insoluble or sparingly water-soluble and belong to the following classes of compounds: stilbenes, coumarins, benzocoumarins, pyrenes, pyrazines, pyrazolines, oxazines, mono- or di-benzoxazolyl or -benzimidazolyl compounds, aryltriazole and v-triazole derivatives and naphthalic acid imides.

It will be understood that the type of dye will be largely determined by the desired colour shade and the field of application of the aqueous dyestuff preparations of the present invention.

If these preparations are employed, for example, to prepare printing pastes and for subsequent use in transfer printing, the water-insoluble or sparingly water-soluble dyes which are used are those which are suitable for the transfer printing process, especially disperse dyes which vaporise to at least 60% in less than 60 seconds at atmospheric pressure between 150° and 220° C. and which are stable to heat and can be transferred without decomposition.

If the preparations are employed, for example, to prepare printing pastes for printing textile materials by direct printing, which is a preferred mode of application of the dyestuff preparations of the invention, or to prepare dyebaths for dyeing textile material, disperse dyes are used which have good dyeing and fixation characteristics and produce dyeings which are wetfast and fast to sublimation and light.

Moreover, it is also possible, within the scope of the definition to employ mixtures of the same or different types of dye and also of fluorescent whitening agents in the aqueous preparations. Preferably, the preparations of the invention contain 35 to 50% by weight of dye or fluorescent whitening agent.

The anionic dispersants are, in particular, ligninsulphonates, for example those which are obtained by the sulphite process or kraft process. They are preferably products which are partially hydrolysed, oxidised or desulphonated and have been fractionated by known processes, for example in accordance with the molecular weight or in accordance with the degree of sulphonation. Mixtures of sulphite- and kraft-ligninsulphonates are also very effective. Particularly suitable ligninsulphonates are those having an average molecular weight between 1,000 and 80,000, an active ligninsulphonate content of at least 80% and preferably a low content of polyvalent cations. The degree of sulphonation can vary within wide limits. The ratio of carbon to organically bonded sulphur is, for example, between 9:1 and 55.1.

Amongst these ligninsulphonates, the following are preferred:

(a) Kraft-ligninsulphonate in which 80% of the have a molecular weight between 6,000 and 50,000 and in which the ratio of carbon to organically bonded sulphur is about 33:1, (b) Sulphite-ligninsulphonate in which 80% of the molecules have a molecular weight between 10,000 and 50,000 and in which the ratio of carbon to organically bonded sulphur is about 24.5:1, (c) Sulphite-ligninsulphonate in which 10% of the molecules have a molecular weight below 10,000, 25% have a molecular weight between 10,000 and 40,000 and 65% have a molecular weight above 40,000 and in which the ratio of carbon to organically bonded sulphur is about 23:1, (d) Kraft-ligninsulphonate in which 80% of the molecules have a molecular weight between 2,000 and 30,000 and in which the ratio of carbon to organically bonded sulphur is about 46:1, and (e) A mixture of kraft- and sulphite-ligninsulphonates in which 15–20% of the molecules have a molecular weight below 10,000, 33–45% have a molecular weight between 10,000 and 30,000 and 35–52% have a molecular weight above 30,000 and in which the ratio of carbon to organically bonded sulphur is 31:1 to 39:1.

Further compounds which likewise have a good utility in the preparations according to the invention are the sulphonated condensation products described in German Offenlegungsschrift No. 2,353,691. These are, in particular, compounds which have been obtained by reaction of a naphthalene compound, which can be substituted by hydroxyl, chlorine or methyl, with a compound of the formula

in which X is a direct bond or oxygen, Hal is chlorine or bromine and n is an integer from 1 to 4, and sulphonisation and, if desired, by further condensation of the reaction product with formaldehyde or formaldehyde donors.

Further compounds which are useful anionic dispersants for the preparations according to the invention are condensation products of aromatic sulphonic acids and formaldehyde, such as condensation products of formaldehyde and naphthalenesulphonic acids or of formaldehyde, naphthalenesulphonic acid and benzenesulphonic acid, or a condensation product of crude cresol, formaldehyde and naphthalenesulphonic acid.

Further suitable anionic dispersants are the compounds of the formula $$R-X-(CH_2-CR^1-Y)-(CH_2-CR^2-Z)_b-H$$

which are described in U.S. Pat. Nos. 3,498,942, 3,632,466, 3,498,943, 3,772,382, 3,668,230, 3,776,874 and 3,839,405, in particular the potassium salts of those compounds having a molecular weight of about 1200 to 1500 (Polywet KX-3, KX-4 and KX-5).

Usually, these anionic dispersants are in the form of their alkali metal salts, their ammonium salts or their water-soluble amine salts. Advantageously, grades which have a low content of other electrolytes should be employed. It is also possible to use mixtures of the abovementioned anionic dispersants.

The amount of anionic dispersant is 0.1 to 5%, especially 0.5–2%, by weight, based on the weight of the preparation, or 2 to 10% by weight, preferably 4 to 8% by weight, based on the dye.

In addition to the anionic dispersant, the preparations of the invention contain 0.5 to 5%, especially 1 to 3%, by weight, based on the weight of the preparation, or 3 to 15% by weight, preferably 6 to 13% by weight, based on the dye, of a non-ionic copolymer of ethylene oxide and a further olefin oxide, said copolymer having an ethylene oxide content of at least 65% by weight and preferably of at least 80% by weight.

The olefin oxide is, for example: 1,2- or 2,3-butylene oxide, styrene oxide, 2,3-epoxyhexane, 1,2-epoxyhexane, 1,2-epoxyoctane, butadiene monoxide or cyclohexene monoxide but especially propylene oxide.

Preferred copolymers are those of ethylene oxide and propylene oxide which have the formula

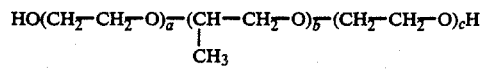

in which the sum of a and c is a number of at least 150 and preferably between 200 and 400 and b is a number between 20 and 100, preferably 30 to 80.

Of these preferred copolymers, the following are particularly suitable for the process of the invention:

(a) copolymers of the formula indicated above, in which the sum of a and c is a number from 200 to 225 and b is a number from 60 to 80, (b) copolymers of the formula indicated above, in which the sum of a and c is a number from 280 to 320 and b is a number from 50 to 60, and (c) copolymers of the formula indicated above, in which the sum of a and c is a number from 220 to 280 and b is a number from 40 to 55.

If desired, further ingredients which improve the characteristics can be added to these dyestuff preparations, for example hygroscopic agents and antifrost agents, for example the polyols, ethylene glycol, monopropylene glycol, diethylene glycol, glycerol, sorbitol and others, or formamide; antimicrobial agents; fungicides, for example aqueous formalin solution; antifoams and viscosity improvers.

It is advantageous to add complexing compounds to the preparations as further ingredient, especially polyphosphates, in an amount of 0.1 to 5, especially 0.5 to 2, % by weight, based on the weight of the preparations. Preparations which are particularly stable on storage are those which contain at least 20% by weight of water, 25 to 60%, especially 35–50%, by weight of a finely divided disperse dye, 0.1 to 5%, especially 0.5–2% by weight of a ligninsulphonate and 0.5 to 5% especially 1–3%, by weight of a copolymer of ethylene oxide and propylene oxide with an ethylene oxide content of at least 65% by weight and also, if desired, 0.1 to 5%, preferably 0.5–2%, by weight of a polyphosphate and/or further ingredients.

The following dyestuff preparations are preferred:

(1.) Dyestuff preparations containing 35 to 45% of the violet dye of the formula

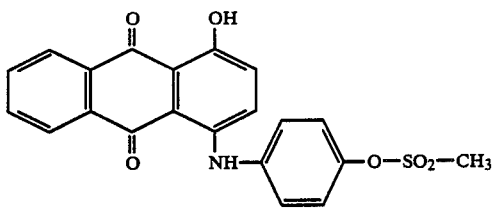

15 to 25 % of propylene glycol,
2 to 5 % of a non-ionic polycondensation product of about 20% of propylene oxide and about 80% of ethylene oxide and having a molecular weight of about 16,500,
1 to 3% of a sulphonated fractionated kraft-lignin with a ratio of carbon to organically bonded sulphur of about 33:1 and consisting of 80% of molecules having a molecular weight between 600 and 50,000,
0.5 to 1% of bactericide,
0.1 to 0.5% of antifoam, and
30 to 40% of water.

(2) Dyestuff preparations containing
35 to 50% of the yellow dye of the formula

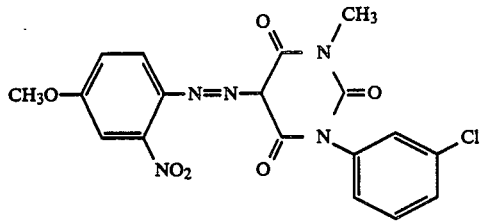

15 to 25% of propylene glycol,
2 to 5% of a non-ionic polycondensation product of about 20% of propylene oxide and about 80% of ethylene oxide and having a molecular weight of about 16,500,
1 to 3% of a sulphonated fractionated kraft-lignin with a ratio of carbon to organically bonded sulphur of about 33:1 and consisting of 80% of molecules having a molecular weight between 6000 and 50,000,
0.5 to 1% pf bacterocode.
0.1 to 0.5% of antifoam, and
30 to 40% of water.

(3) Dyestuff preparations containing
30 to 40% of the yellow dye of the formula

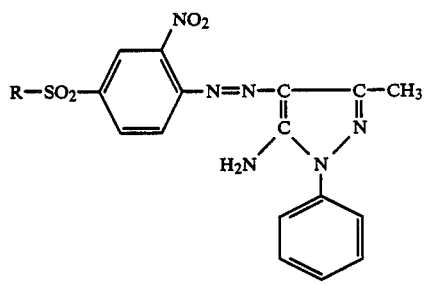

(R = mixture of CH₃ and C₂H₅, 1:1)

15 to 25% of propylene glycol,
2 to 5% of a non-ionic polycondensation product of about 20% of propylene oxide and about 80% of ethylene oxide and having a molecular weight of about 16,500,
1 to 3% of a sulphonated fractionated kraft-lignin with a ratio of carbon to organically bonded sulphur of about 33:1 and consisting of 80% of molecules having a molecular weight between 6000 and 50,000,
0.5 to 1% of bactericide,
0.1 to 0.5% of antifoam, and
30 to 40% of water.

(4) Dyestuff preparations containing
30 to 40% of the navy blue dye of the formula mixture of 1:3 mixture of 1:3

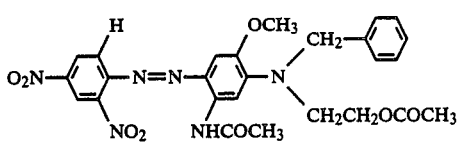

and

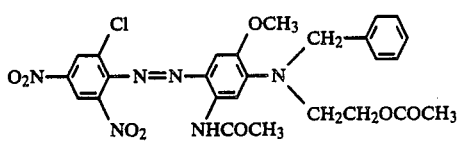

15 to 25% of propylene glycol,
2 to 5% of a non-ionic polycondensation product of about 20% of propylene oxide and about 80% of ethylene oxide and having a molecular weight of about 16,500,
1 to 3% of a sulphonated fractionated kraft-lignin with a ratio of carbon to organically bonded sulphur of about 33:1 and consisting of 80% of molecules having a molecular weight between 6000 and 50,000,
0.5 to 1% of bactericide,
0.1 to 0.5% of antifoam, and
30 to 45% of water.

(5) Dyestuff preparations containing
30 to 40% of the pink dye of the formula

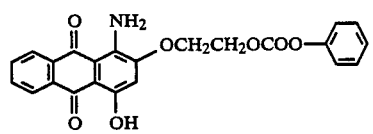

15 to 25% of propylene glycol,
2 to 5% of a non-ionic polycondensation product of about 20% of propylene oxide and about 80% of ethylene oxide and having a molecular weight of about 16,500,
1 to 3% of a sulphonated fractionated kraft-lignin with a ratio of carbon to organically bonded sulphur of about 33:1 and consisting of 80% of molecules having a molecular weight between 6000 and 50,000,
0.5 to 1% of bactericide,
0.1 to 0.5% of antifoam, and
30 to 45% of water.

(6) Dyestuff preparations containing
25 to 35% of the red dye of the formula

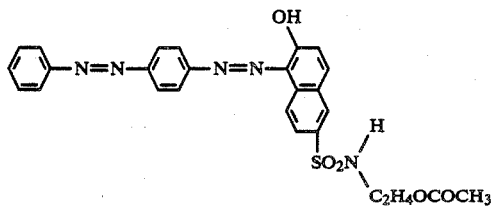

15 to 25% of propylene glycol,
2 to 5% of a non-ionic polycondensation product of about 20% of propylene oxide and about 80% of ethylene oxide and having a molecular weight of about 16,500,
1 to 3% of a sulphonated fractionated kraft-lignin with a ratio of carbon to organically bonded sulphur of about 33:1 and consisting of 80% of molecules having a molecular weight between 6000 and 50,000,
0.5 to 1% of bactericide,
0.1 to 0.5% of antifoam, and
40 to 50% of water.

(7) Dyestuff preparations containing
20 to 30% of the yellow dye of the formula

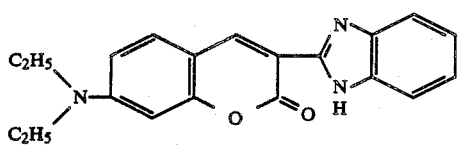

15 to 25% of propylene glycol,
2 to 5% of a non-ionic polycondensation product of about 20% of propylene oxide and about 80% of ethylene oxide and having a molecular weight of about 16,500,
1 to 3% of a sulphonated fractionated kraft-lignin with a ratio of carbon to organically bonded sulphur of about 33:1 and consisting of 80% of molecules having a molecular weight between 6000 and 50,000,
0.5 to 1% of bactericide,
0.1 to 0.5% of antifoam, and
40 to 60% of water.

(8) Dyestuff preparations containing
10 to 20% of the yellow dye of the formula

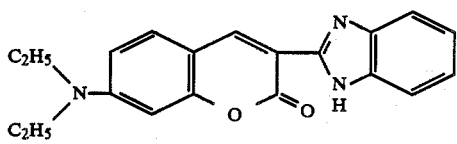

5 to 15% of propylene glycol,
1 to 3% of a non-ionic polycondensation product of about 20% of propylene oxid and about 80% of ethylene oxide and having a molecular weight of about 16,500,
0.5 to 2% of a sulphonated fractionated kraft-lignin with a ratio of carbon to organically bonded sulphur of about 33:1 and consisting of 80% of molecules having a molecular weight between 6000 and 50,000,
0.3 to 0.6% of bactericide,
0.1 to 0.5% of antifoam, and
60 to 80% of water.

(9) Dyestuff preparations containing
35 to 40% of the scarlet dye of the formula

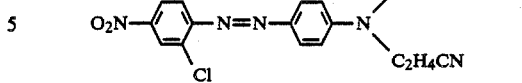

15 to 25% of propylene glycol,
2 to 5% of a non-ionic polycondensation product of about 20% of propylene oxide and about 80% of ethylene oxide and having a molecular weight of about 16,500,
1 to 3% of a sulphonated fractionated kraft-lignin with a ration of carbon to organically bonded sulphur of about 33:1 and consisting of 80% of molecules having a molecular weight between 6000 and 50,000,
0.5 to 1% of bactericide,
0.1 to 0.5% of antifoam, and
30 to 40% of water.

(10) Dyestuff preparations containing
35 to 40% of the yellow dye of the formula

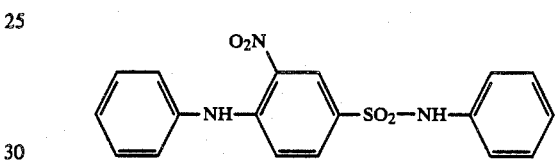

15 to 25% of propylene glycol,
2 to 5% of a non-ionic polycondensation product of about 20% of propylene oxide and about 80% of ethylene oxide and having a molecular weight of about 16,500,
1 to 3% of a sulphonated fractionated kraft-lignin with a ratio of carbon to organically bonded sulphur of about 33:1 and consisting of 80% of molecules having a molecular weight between 6000 and 50,000,
0.5 to 1% of bactericide,
0.1 to 0.5% of antifoam, and
30 to 40% of water.

(11) Dyestuff preparations containing
40 to 45% of the yellow dye of the formula

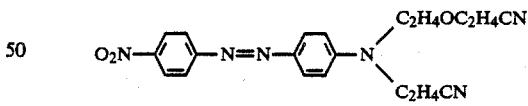

15 to 25% of propylene glycol,
2 to 5% of a non-ionic polycondensation product of about 20% of propylene oxide and about 80% of ethylene oxide and having a molecular weight of about 16,500,
1 to 3% of a sulphonated fractionated kraft-lignin with a ratio of carbon to organically bonded sulphur of about 33:1 and consisting of 80% of molecules having a molecular weight between 6000 and 50,000,
0.5 to 1% of bactericide,
0.1 to 0.5% of antifoam, and
30 to 40% of water.

(12) Dyestuff preparations containing
25 to 30% of the blue dye of the formula

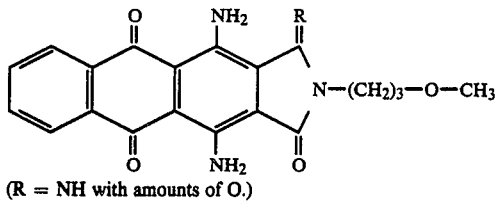

(R = NH with amounts of O.)

15 to 25% of propylene glycol,
2 to 5% of a non-ionic polycondensation product of about 20% of propylene oxide and about 80% of ethylene oxide and having a molecular weight of about 16,500,
1 to 3% of a sulphonated fractionated kraft-lignin with a ratio of carbon to organically bonded sulphur of about 33:1 and consisting of 80% of molecules having a molecular weight between 6000 and 50,000,
0.5 to 1% of bactericide,
0.1 to 0.5% of antifoam, and
40 to 50% of water.

The aqueous dyestuff preparations of the present invention are obtained, for example, by mixing and grinding the indicated dye in water with at least one of the said anionic dispersants and/or non-ionic copolymer of ethylene oxide and a further olefin oxide, for example in a ball mill or sand mill, and adding the remaining components before, during or not until after the grinding process, resulting in a preparation which has a particle size of less than $10\mu$ and in particular of less than $2\mu$.

As the preparations of the invention have a low electrolyte content, electrolyte-sensitive thickeners can now also be used to prepare printing pastes, which is not possible in the case of commercially available preparations of disperse dyes. In this connection, thickeners which have an especially valuable utility are, in particular, polyacrylic thickeners. The viscosity of these thickeners is not significantly lowered by the preparations of the invention, a fact which is of decisive importance in practice.

The dyestuff preparations of the invention are of low viscosity, have a low dispersantcontent and a low electrolyte content, are finely disperse and stable dispersions, i.e. do not aggregate, and have a high concentration of dye. During both prolonged storage at 25° to 30° C. and after a storage of several weeks at 60° C. they remain stable i.e. their viscosity is low and they can be filtered without difficulty, and their viscosity changes only insignificantly. The state of fine division of the dyes remains virtually unchanged during storage. The preparations can be dispersed speck-free in textile printing inks with all conventional thickeners. On account of the high degrees of fixation which can be obtained with the preparations, no fixation catalysts are required when the preparations are used for direct printing on polyester material.

A very significant advantage when the preparations are used for direct printing on textile material is that the dyed material need not be given a washing-off or is given only a single washing-off with a small amount of water. This is because of the low content of dispersant, the possibility of using synthetic polyacrylic thickeners, and the high degree of fixation.

If the dyed material is given a washing-off, this can be effected with tetrachloroethylene instead of water, preferably at about 20°-25° C. It is advantageous to add to the tetrachloroethylene small amounts of a cleansing agent, such as a tetraalkylammonium salt, for example dimethyldidodecylammonium chloride, dimethylmethanephosphonate or hexamethylphosphoric acid triamide, in an amount of about 1-10 g/l, preferably 2-5 g/l.

The preparations of disperse dyes obtainable up till now usually contain a small amount of dye alongside large amounts of dispersants, which have to be washed out after fixation of the dye. The operation results in heavy pollution of the wastewaters.

The aqueous dye preparations of this invention are used to prepare aqueous, aqueous-organic or organic dye liquors or printing inks, or those based on a water-in-oil emulsion. These are suitable for dyeing or printing organic material, especially synthetic textile material, by a continuous or discontinuous procedure, for example those materials based on cellulose triacetate, synthetic polyamides and, in particular, polyesters. The dyeings can be obtained by dyeing, padding or printing processes. The additives used in these processes are those customarily employed when applying disperse dyes to synthetic material. The materials can be in very diverse stages of processing.

In the continuous dyeing of mixed fabrics of polyester and cellulose material, it is customary to use disperse dyes for the polyester and, inter alia, reactive dyes for the cellulose by the one-bath single-stage process. As is known, undesired reactions between anionic dispersants in the disperse dye and the reactive dye arise and result in considerable reductions in the yield of the reactive dyeings and thus in problems with regard to the reproducibility of the dyeings and also in increased pollution of the wastewaters.

If, on the other hand, disperse dye formulations of the present invention are employed, the defects described are completely or substantially eliminated.

The dye preparations according to the invention can also be used for printing fabrics in accordance with the principle of transfer printing.

The transfer printing process is generally known and described in detail, for example, in French Patent Specification Nos. 1,223,330, 1,334,829 and 1,585,119. In this process, supports, which are printed with suitable printing inks, are brought into close contact with the substrate to be printed, after which the dye is transferred from the support to the substrate under the action of heat and/or pressure.

Supports are planar structures, advantageously having a smooth surface, made of paper, cellophane, metal foils and the like, which are stable to heat and dimensionally stable (cf. British Patent Specification No. 1,190,889). Paper is preferred.

The composition of the printing inks depends on the nature of the substrate, the printing process, the support and other factors. Printing inks co:monly used are both aqueous printing inks and solvent-based, particularly alcohol-based, printing inks. In general, they consist of a sublimable dye, a binder, water and/or a solvent and, if desired, thickeners, fillers and dispersants.

The aqueous preparations of the invention of transferable disperse dyes have the significant feature that they can be dispersed both in pure aqueous printing ink systems and in aqueous-alcoholic printing ink systems to produce aggregate-free and stable dispersions.

The transfer is carried out in the conventional manner by the action of heat. For this purpose, the treated supports are brought into contact with the textile material to be printed and kept at about 120° to 210° C. until the dyes applied to the support have transferred to the textile material. As a rule, 5 to 60 seconds suffice for this.

When the heat treatment is finished, the printed material is separated from the support. The material requires no after-treatment, neither a steam treatment in order to fix the dye nor washing in order to improve the fastness properties.

Suitable transfer printing substrates are preferably planar structures such as fleeces, felts, carpets and, in particular, woven fabrics and knitted fabrics made of synthetic fibres.

If the novel preparations contain fluorescent whitening agents, they are used for whitening textile material by, for example, the exhaustion method, the high-temperature exhaustion method and the pad-heat method. If desired, further suitable dispersants or other assistants can be added in order to stabilise the liquor and/or to obtain carrier effects.

A further use for the fluorescent whitening agent preparations of the invention is the whitening of spinning melts.

The following examples illustrate the invention without restricting it thereto. Parts and percentages are by weight. Unless otherwise stated, the viscosities were measured at 20° C. using a RVT Brookfield viscometer with spindle 3 at 50 revolutions per minute (rpm).

The filtering properties of the dyes were determined with the aid of the following filter test:

200 ml of softened water are added to a weighed amount of ground material and the mixture is stirred intensively for 1 minute. The amount of grinding stock is such that the test dispersion contains 1 part per thousand of dye active ingredient. The dilute dispersion is filtered on a porcelain suction filter through a 7 cm φ hard filter (Schleicher & Schüll filter 597) under a vacuum of about 25 mm Hg. Perfect filtration is possible with hard filter 597 only when the suspension contains dye particles which are essentially smaller than 5 microns.

EXAMPLE 1

400 parts of the disperse dye of the formula

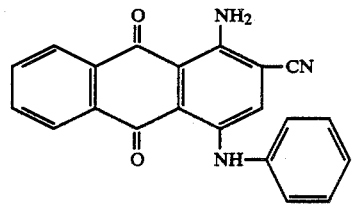

in the form of the crude dye which has been substantially freed from electrolytes and dried, 10 parts of a sulphonated fractionated kraft-lignin which has a ratio of carbon to organically bonded sulphur of 46:1 and consists of 80% of molecules having a molecular weight between 2,000 and 30,000, and 20 parts of a non-ionic polycondensation product consisting of 20% of polypropylene oxide and 80% of polyethylene oxide and having a molecular weight of about 16,500 are stirred in a dispersing medium consisting of 398 parts of water, 170 parts of 1,2-propylene glycol and 2 parts of the preservative 1-(3-chloroallyl)-3,5,7-triazo-azonium-adamantane chloride.

The dispersion is ground in a stirred mill with zirconium oxide grinding elements until the bulk of the dye particles have a primary particle size of less than 5μ. The grinding stock is separated from the grinding elements and deaerated. The dispersion has a viscosity of 120 cp. By adding 0.1 to 0.2% by weight of xanthan gum and stirring for several hours, the viscosity is increased to a value between 500 and 1,000 cp. The pH value is 9.4. The resulting product is a dyestuff preparation which is of low viscosity and which can be filtered easily. The viscosity and degree of dispersion of this preparation change only insignificantly even after storage for several weeks at 60° C. or after storage for several months at changing room temperatures.

The same result is obtained when the dispersion is ground in a bead mill or sand mill.

The resulting dyestuff preparation is particularly suitable for the preparation of aqueous and partly aqueous printing inks for printing supports for transfer printing.

A dyestuff preparation whose viscosity increases after storage for only 3 days at room temperature and which forms a gel at temperatures above 40° C. in the course of only 12 hours is obtained by repeating the above procedure exactly, but using only 30 parts of sulphonated kraft-lignin instead of the mixture of 10 parts of sulphonated kraft-lignin and 20 parts of the non-ionic polycondensation product.

A dye preparation which initially has similar properties is obtained by repeating the procedure described above exactly, but using only 30 parts of the non-ionic polycondensation product instead of the mixture of 10 parts of the sulphonated kraft lignin and 20 parts of the non-ionic polycondensation product. However, after storage for several weeks at room temperature, but especially after storage for several days at 60° C., a distinct reduction in the filtering properties and the formation of a viscous sediment owing to the formation of aggregates can be determined.

EXAMPLES 2-13

Dyestuff preparations having properties analogous to those of the dye preparation of Example 1, and in particular with equally good storage stability properties, are obtained by repeating the procedure of Example 1, but using identical amounts of the sulphonated fractionated kraftlignins (Examples 2 to 5), of the post-sulphonated fractionated sulphite-lignins (Examples 6 to 10) and of the mixtures of these two (Examples 11 to 13) indicated in the following table instead of the sulphonated kraft-lignin of Example 1.

| Example | Molecular weight* | | Degree of sulphonation** C:S |
|---|---|---|---|
| 2 | | 6,000–50,000 | 33:1 |
| 3 | | 1,000–35,000 | 15:1 |
| 4 | | 1,600–10,000 | 9.6:1 |
| 5 | | 7,000–120,000 | 21:1 |
| 6 | | 10,000–50,000 | 24.5:1 |
| 7 | 10% | <10,000 | 23:1 |
| | 25% | 10,000–40,000 | |
| | 65% | >40,000 | |
| 8 | | 4,000–50,000 | 18:1 |
| 9 | | 4,000–50,000 | 17:1 |
| 10 | | 5,000–35,000 | 17:1 |
| 11 | 20% | <10,000 | 20:1 |
| | 45% | 10,000–30,000 | |
| | 35% | >30,000 | |
| 12 | 15% | <10,000 | 20:1 |

| Example | Molecular weight* | | Degree of sulphonation** C:S |
|---|---|---|---|
| 13 | 40% | 10,000–30,000 | |
| | 45% | >30,000 | |
| | 15% | <10,000 | 23:1 |
| | 33% | 10,000–30,000 | |
| | 52% | >30,000 | |

*Unless otherwise stated, the values for the molecular weight signify that 80% of the molecules lie within the indicated range.
**The degree of sulphonation is based on the sulphur bonded to the phenylpropane units.

EXAMPLES 14–19

Liquid formulations having properties analogous to those of the dyestuff preparations of Examples 1–13, and in particular having equally low viscosities and similarly good storage stability properties are obtained by using instead of kraft-ligninsulphonates or sulphite-lignin sulphonates indicated in Examples 1–13, identical amounts of the sulphonated kraft-lignins (Examples 14–17), of the postsulphonated fractionated sulphite-lignin (Example 18) and of the mixture of fractionated kraft- and sulphite-ligninsulphonates, which subsequently has also been hydrolysed, oxidised and desulphonated (Example 19) indicated in the following table, and additionally combining these anionic dispersants with 5 parts of a polyphosphate (Calgon) and otherwise repeating the procedure described in Example 1, except that 5 parts less of water are used. The presence of Calgon in these ligninsulphonates results in markedly improved stabilising effects.

| Example | Molecular weight* | | Degree of sulphonation** C:S |
|---|---|---|---|
| 14 | 5,000–50,000 | | 19:1 |
| 15 | 2,000–40,000 | | 12.4:1 |
| 16 | 1,000–30,000 | | 23:1 |
| 17 | 1,000–30,000 | | 11.5:1 |
| 18 | 4,000–50,000 | | 55:1 |
| 19 | 10% | <10,000 | 54:1 |
| | 28% | 10,000–30,000 | |
| | 62% | >30,000 | |

*Unless otherwise stated, the values for the molecular weight signify that 80% of the molecules lie within the indicated range.
**The degree of sulphonation is based on the sulphur bonded to the phenylpropane units.

EXAMPLE 20

450 parts of the disperse dye of the formula

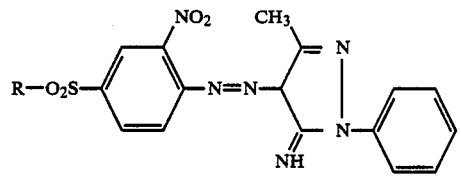

R = 50% CH$_3$, 50% C$_2$H$_5$ in the form of the crude dye having a low electrolyte content, are stirred together with 10 parts of the sulphonated kraft-lignin of Example 2 and 20 parts of the non-ionic polycondensation product of Example 1 in a dispersing medium consisting of 368 parts of water, 150 parts of glycerol and 2 parts of the preservative of Example 1 and the dispersion is ground in a sand mill using Ottawa sand until the particle fineness indicated in Example 1 is obtained. The resulting formulation has a viscosity of 200 cp (Brookfield viscometer, spindle 2, 20° C., 30 rpm). A viscosity of 860 cp is obtained by stirring in 0.15% of xanthan gum. A dyestuff preparation of low viscosity is obtained which retains its excellent filtering properties even after storage for seven days in a closed vessel at 60° C. or after storage for several months at room temperature. Admixture of this dye preparation with a polyacrylic acid printing ink thickener yields a printing paste the viscosity of which remains virtually unchanged even after 3 months.

If, on the other hand, a dyestuff preparation which has been prepared in known manner and has the following compositon:

17.5 parts of the crude dye of the formula indicated above, 11.3 parts of a mixture of about 8.2 parts of the sulphite lignin of Example 9 and about 3.1 parts of the sulphonated kraft-lignin with a ratio of carbon to oranically bonded sulphur of 23:1, said mixture consisting of 80% of molecules having a molecular weight between 1,000 and 30,000, 7.8 parts of a condensation product of naphthalenesulphonic acid and formaldehyde, 20.0 parts of ethylene glycol, 0.1 part of a preservative, 0.2 part of a xanthan gum and 43.1 parts of water, is added to a Carbopol printing ink thickener in an amount such that the same pigment concentration in the printing paste results, then the viscosity of the Carbopol printing paste is lowered to such an extent that the paste is unfit for use in practice.

A dyestuff preparation which, after grinding, has a viscosity of 530 cp is obtained by repeating exactly the procedure described in the first paragraph, except that 30 parts of the sulphonated kraft-lignin are used instead of the mixture of 10 parts of the sulphonated kraft-lignin and 20 parts of the non-ionic polycondensation product. This preparation starts to gel after standing for a short time at room temperature. After 11 hours, the viscosity is 2,200 cp and after storing for seven days at 60° C. the preparation has irreversibly gelled and thus is unfit for use.

A dye preparation which, after grinding, has a viscosity of 550 cp is obtained by repeating exactly the procedure described above, except that, in place of the mixture of 10 parts of the sulphonated kraft-lignin and 20 parts of the non-ionic polycondensation product, only 30 parts of the same non-ionic polycondensation product are used. After storage for seven days at 60° C. the viscosity is still 190 cp and a very viscous sediment has formed. After stirring up this sediment, the dispersion, which originally was very readily filterable, can no longer be filtered because of reaggregation. (Filter test as described above).

EXAMPLE 21

440 parts of the disperse dye of the formula

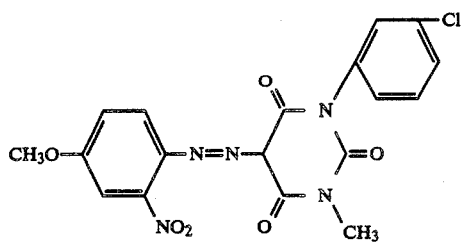

in the form of the dried (less than 0.5% of water) filter cake with a low electrolyte content, are stirred together with 20 parts of the sulphonated kraft-lignin of Example 2 and 20 parts of the non-ionic polycondensation product of Example 1 in a dispersing medium consisting of 170 parts of 1,2-propylene glycol, 348 parts of water and 2 parts of the preservative of Example 1, and the dispersion is ground in a bead mill with 1 mm siliquartzite beads until the particle fineness indicated in Example 1 is attained. A dispersion which has a viscosity of 540 cp is obtained. After storage for several months at changing room temperatures, or after storage for five weeks at 60° C., there is still no reduction whatsoever in the very good filtering properties.

The dyeing preparation is especially suitable for use in printing pastes for direct printing on polyester material.

Dyestuff preparations which can no longer be filtered after storage for only 7 days at 60° C. are obtained by repeating the above procedure exactly, except that, instead of 10 parts of the sulphonated kraft-lignin and 20 parts of the non-ionic polycondensation product, 30 parts of the same sulphonated kraft-lignin by itself or 30 parts of the non-ionic polycondensation product by itself are used. (Filter test as described above).

These preparations are unfit for use in practice.

The preparation obtained using sulphonated kraft-lignin by itself gels rapidly and forms specks in the conventional printing ink thickeners.

EXAMPLE 22

450 parts of the disperse dye of the formula

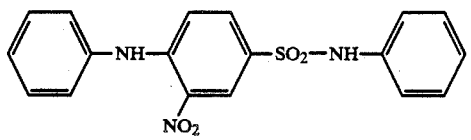

in the form of the filter cake which has been washed until it has a low electrolyte content and dried, are stirred together with 10 parts of the sulphonated kraft-lignin of Example 2 and 20 parts of the non-ionic polycondensation product of Example 1 in a dispersing medium consisting of 170 parts of ethylene glycol, 5 parts of 35% formaldehyde solution and 345 parts of water, and the dispersion is ground in a ball mill with zirconium oxide grinding elements until the particle fineness indicated in Example 1 is obtained. A dispersion which has a viscosity of 50 cp is obtained. This value is still unchanged even after storage for 14 days at 60° C. When thickened with 0.2% of a xanthan gum, the low viscosity of this preparation remains unchanged even after storage for seven months at room temperature and no viscous sediment forms; the filtering properties also do not change. If this preparation is stirred into conventional printing ink thickeners, these remain completely speck-free.

Dyestuff preparations which gel on storage and form distinct specks in printing ink thickeners are obtained by repeating the procedure described above exactly, except that, instead of 10 parts of the sulphonated kraft-lignin and 20 parts of the non-ionic polycondensation product, 20 parts of the same sulphonated kraft-lignin by itself or 20 parts of the non-ionic polycondensation product by itself are employed.

EXAMPLES 23-30

The dyes listed in column 2 of the following table are stirred in the form of the crude dye with a low electrolyte content, and in the amounts indicated in column 3, with one part of the sulphonated kraft-lignin of Example 1, the amounts of the non-ionic polycondensation product of Example 1 which are indicated in column 4, 17 parts of 1,2-propylene glycol, 2 parts of the presentative of Example 1 and the amounts of water indicated in column 5 and this dispersion is ground in a closed ball mill with 1 mm siliquartzite beads until the bulk of the dye particles have a finess of less than 5μ or until the filtering properties (according to the filter test described above) are perfect. Dyestuff dispersions are obtained which, after adjusting the viscosity to $\geq 300 \leq 600$ cp by stirring in 0.1–0.2% of the xanthan gum of Example 16, are exceedingly stable on storage. The viscosity and filtering properties of these dyestuff dispersions change to only an insignificant extent after storage for three weeks at 60° C. and then storage at room temperature for 5 months.

The dispersions are particularly suitable for the preparation of alcoholic printing inks for gravure printing and flexographic printing and also for printing the supports for heat transfer printing and specifically for aqueous gravure printing or rotary screen printing.

| | | Parts by weight in the dispersion | | |
|---|---|---|---|---|
| Example | Disperse dye | Dye | Non-ionic polycondensation product | Water |
| 23 | 3-hydroxy-quinophthalone | 48 | 2 | 32 |
| 24 | 1-amino-2-phenoxy-4-hydroxy-anthraquinone | 50 | 2 | 30 |
| 25 | 4-nitro-4'-oxyethyl-ethyl-amino-azobenzene | 43 | 2 | 37 |
| 26 | 2-chloro-4-nitro-4'-oxy-ethyl-ethylamino-azobenzene | 45 | 2 | 35 |
| 27 | 1,4-diamino-2-methoxy-anthraquinone | 42 | 2 | 38 |
| 28 | 1,4-di-monomethylamino-anthraquinone | 48 | 2 | 32 |
| 29 | 1-amino-4-anilido-anthra-quinone | 45 | 2 | 35 |
| 30 | 1-hydroxy-4-p-toluidino-anthraquinone | 40 | 3 | 40 |

EXAMPLE 31-36

The dyes listed in column 2 of the following table are stirred in the form of the crude dye with a low electrolyte content, and in the amounts indicated in column 3, with the amounts of the sulphonated kraft-lignin of Example 1 which are indicated in column 4, the amounts of the non-ionic polycondensation product of Example 1 which are indicated in column 5, 17 parts of 1,2-propylene glycol, 2 parts of the preservative of Example 1 and the amounts of water indicated in column 6 and this dispersion is ground in a closed ball mill with 1 mm siliquartzite beads, or in a vertical open sand mill (Süssmeyer) with Ottowa sand, until the bulk of the dye particles have a fineness of less than 5μ or until the filtering properties (according to the filter test described above) are perfect. Dyestuff dispersions are obtained which retain their low viscosity and excellent filtering properties even after prolonged storage at 60° C. and which are suitable in particular for direct printing on polyester with printing pastes which contain synthetic, electrolyte-sensitive thickeners.

|  |  | Parts by weight in the dispersion | | | |
| --- | --- | --- | --- | --- | --- |
| Example | Disperse dye | Dye | Sulphonated kraft-lignin | Non-ionic polycondensation product | Water |
| 31 | 3-(2'-benzimidazolyl)-7-diethylamino-coumarin | 35 | 2 | 3 | 43 |
| 32 | mixture of 1,4-diamino-anthraquinone-N—(3-methoxypropyl)-2,3-dicarboxylic acid imide and 1,4-diamino-anthraquinone-N—(-methoxypropyl)-2-(carboxylic acid)-3-(carboxylic acid imine-imide | 35 | 1 | 2.5 | 44.5 |
| 33 | 1-hydroxy-4-[4'-methane-sulphonyl]-phenylamino-anthraquinone | 45 | 2 | 3 | 33 |
| 34 | 2-chloro-4-nitro-4'-cyano-ethyl-cyanoethyloxyethyl-aminoazobenzene | 38 | 2 | 2 | 41 |
| 35 | 4-nitro-4'-cyanoethyl-cyanoethyloxyethylamino-azobenzene | 42 | 2 | 2 | 36 |
| 36 | 2,5-dichloro-4-nitro-2'-chloro-4'-dioxyethylamino-azobenzene | 40 | 1 | 2 | 40 |

EXAMPLES 37–41

The procedure described in the first two paragraphs of Example 1 is repeated except that, instead of 10 parts of the sulphonated kraft-lignin, the same amount of the anionic dispersants listed in the following table is used together with 20 parts of the non-ionic polycondensation product used in Example 1. Dye stuff prepartions are obtained which have properties analogous to those of the preparation of Example 1 and in particular have equally good stability properties on storage.

| Example | Anionic dispersant |
| --- | --- |
| 37 | condensation product of formaldehyde and naphthalenesulphonic acid (Na salt) |
| 38 | higher molecular weight condensation product of formaldehyde and naphthalene-sulphonic acid (Na salt) |
| 39 | Na salt of polymerised alkylnaphthalene-sulphonic acids |
| 40 | 4-sulphonaphthyl-x-sulphophenyldioxomethane |
| 41 | sulphonated polychloromethyldiphenyl, prepared according to German Offenlegungs-schrift 2,353,691 |

EXAMPLES 42 and 43

The procedure described in the first two paragraphs of Example 1 is repeated except that, instead of 20 parts of the non-ionic polycondensation product used in the said example, the same amount of the non-ionic copolymers listed in the following table is used together with 10 parts of the sulphonated kraft-lignin used in Example 1, Dyestuff preparations are obtained which have properties analogous to those of the preparation of Example 1 and in particular have equally good stability properties on storage, including at 60° C.

| Example | Non-ionic copolymer |
| --- | --- |
| 42 | copolymer of 20% of polypropylene oxide and 80% of polyethylene oxide with a molecular weight of about 13,500 |
| 43 | copolymer of 30% of polypropylene oxide and 70% of polyethylene oxide with a molecular weight of about 13,500 |

The procedure indicated above is repeated except that the non-ionic copolymer used is
(a) a copolymer of 20% of polypropylene oxide and 80% of polyethylene oxide with a molecular weight of about 8,750,
(b) a copolymer of 90% of polypropylene oxide and 10% of polyethylene oxide with a molecular weight of about 8,750, and
(c) an adduct of 9–10 moles of ethylene oxide and isoctylphenol according to U.S. Pat. No. 3,067,053.

The dyestuff preparations obtained are unfit for use. The preparations obtained according to (a) can no longer be filtered after brief period of storage at 60° C. the preparations obtained according to (b) already become so highly viscous during grinding that grinding has to be discontinued and the preparations obtained according to (c) have gelled after the grinding elements have been removed.

EXAMPLE 44

A fabric made of 67% of polyester and 33% of cotton is padded to a liquor pick-up of 60% using a liquor of the following composition: 80 g/l of the dyestuff preparation obtained according to Example 22, 10 g/l of the dye of the formula

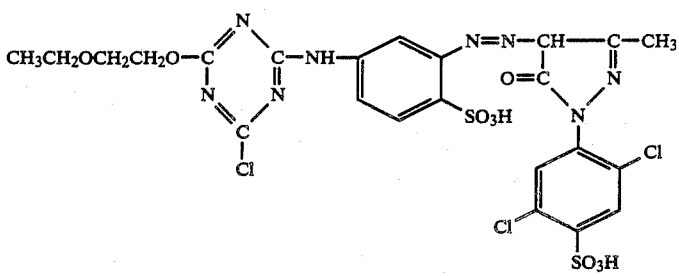

6 g/l of the dye of the formula

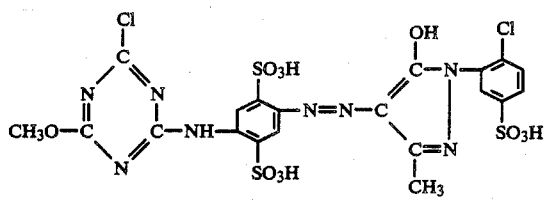

20 g/l of sodium bicarbonate, 100 g/l of urea, 5 g/l of borax and 10 g/l of a commercially available migration inhibitor based on an acrylic acid/acrylamide copolymer.

The fabric is then dried for 1 minute at 120° C. and the dyeing is fixed for 1 minute at 210° C.

Non-fixed dye is removed from the fabric by soaping at the boil with a liquor which contains, per liter, 1 g of an adduct of ethylene oxide and stearylamine and 2 g of sodium carbonate. The wash water contains only a little dye and dispersant.

A yellow-coloured fabric is obtained which is distinguished by perfect levelness and in particular by a perfect solid shade.

A very substantially lighter dyeing is obtained by repeating the procedure described above exactly, but using instead of 80 g/l of the dye preparation obtained according to Example 22, a conventionally formulated dyestuff preparation which contains the same amount of dye but 36 g, instead of 0.8 g, of the same anionic assistant and no nonionic polycondensation product.

An inadequate solid dyeing results since, on account of the interaction between the dispersant for the disperse dye and the reactive dye, the cotton is dyed in a very much lighter shade than the polyester. The wash water is considerably more deeply stained by the reactive dye linked to the dispersant.

EXAMPLE 45

30 parts of the dyestuff preparation obtained according to Example 32 are stirred into 970 parts of a 0.25% solution of a high molecular weight polyacrylic acid in distilled water, the pH of which has been adjusted to 6.8 with sodium hydroxide solution and well homogenised, yielding a printing paste which has a viscosity of 28,000 cp (RVT Brookfield viscometer, spindle 4, 6 rpm at 20° C.

A polyester fabric is printed with this printing paste on a rotary gravure printing machine (roller printing). The printed fabric is then dried at 100°-140° C. and fixed for 8 minutes at 180° C. in high temperature steam.

In place of this HTS fixation, dry fixation (thermosol process) for one minute at 200°-210° C. can equally well be carried out.

After the fixation the goods are ready for use. Polyester prints which have a soft handle, high brilliance and optimum colour strength are obtained. The degree of fixation of the blue dye is more than 99%. It is therefore unnecessary to give the printed and fixed fabric a washingoff because the handle and the fastness properties meet in full the requirements of practice.

A yellow print which has an equally good degree of fixation (>99%) is obtained by stirring in the same amount of the yellow dye formulated according to Example 22 instead of the abovementioned dye, and otherwise repeating the procedure described above. The viscosity of the printing paste is 26,500 cp.

If the abovementioned blue and yellow disperse dyes were to be formulated conventionally, i.e. as in Example 20, second paragraph, they could not be used in the process described above because the viscosity of the thickening system falls too sharply (<100 cp).

EXAMPLE 46

50 parts of the violet dye preparation obtained according to Example 33 are stirred into 950 parts of a 0.3% solution of a high molecular weight polyacrylic acid in distilled water, the pH of which has been adjusted to 6.8 with sodium hydroxide solution and thoroughly homogenised, yielding a printing paste which has a viscosity of 33,000 cp (RVT-Brookfield viscometer, spindle 4, 6 rpm at 20° C. ).

A polyester woven or knitted fabric is printed with this printing paste on a rotary screen printing machine. It is then pre-dried at 100°-140° C. and the dried woven or knitted fabric is fixed for 8 minutes at 180° C. in high temperature steam. Instead of this high temperature steam treatment, dry fixation for one minute at 200°-210° C. can also be carried out.

After fixation, the textile web is washed only briefly on a winch-beck or continuous washing machine at temperatures of 20°-50° C. Because of the good solubility of the thickener, the minimum amount of synthetic thickener employed and also the very small proportion of non-fixed dye can be removed from the fabric easily and rapidly in cold or lukewarm baths.

Brilliant, deep violet colour shades result which have good fastness to washing, water and rubbing. The degree of fixation of the dye is more than 98%.

When conventionally formulated, i.e. with an amount of anionic dispersant approximately corresponding to the amount of active dye ingredient, the same dye cannot be employed in the direct printing process described above because the viscosity of the printing paste falls to <100 cp owing to the introduction of too much electrolyte. Consequently, the paste is completely unfit for use and cannot be brought to the requisite viscosity even by the addition of more polyvinylcarboxylic acid.

The preparations obtained according to Example 31, 32 and 34–36 can also be employed in the process described above instead of the dyestuff preparation obtained according to Example 33. Deep prints with similarly good fastness properties are likewise obtained and again only one washingoff at low temperatures and/or with a small amount of wash liquor is necessary.

A print having similarly advantageous properties is obtained by using in the above Example, instead of 950 parts of a 0.3% solution of a high molecular weight polyacrylic acid, the same number of parts of a 0.7% solution of an ethylene/maleic acid anhydride copolymer, the pH value of which has been adjusted with sodium hydroxide solution to 6.8, and otherwise carrying out the procedure described above.

EXAMPLE 47

A printing paste is prepared by stirring 7.5 parts of an aqueous dyestuff preparation according to Examples 1–13 into 92.5 parts of a stock thickener which contains 0.4% of a high polymeric polyacrylic acid dissolved in water with the addition of ammonia to adjust the pH value to 7.1.

By stirring in the dyestuff preparations, the viscosity of the stock thickener changes from 30,000 cp to between 18,000 and 21,000 cp (Brookfield viscometer, spindle 4, 12 rpm), i.e. to a value which can be tolerated in practice.

This printing paste is applied to paper using a gravure printing machine or by screen printing or rotary screen printing. The paper is suitable for use in the transfer printing process on textile material, for example polyester material. Sharp level prints with a high depth of shade result.

The preparations of sublimable dyes obtained according to Examples 23–30 can be used in concentrations of up to 80 g/kg in the same stock thickener with equally good results.

If a preparation which contains the dye of Example 1 in conventional format on, i.e. with 50 to 100% of anionic dispersant (ligninsulphonate and/or naphthalene/formaldehyde condensation product or other conventional anionic dispersants) is stirred into the stock thickener indicated above, then the resulting solution can no longer be used for printing, as the viscosity falls to about 70 to 80 cp (Brookfield viscometer, spindle 2, 30 rpm).

EXAMPLES 48–63

The dyestuff preparations and stock thickeners listed in the following table are used, in the indicated amount, instead of the dyestuff preparation of Example 1 and the stock thickener of Example 47. The printing pastes obtained can likewise be used either in flat screen printing, in rotary screen printing, in gravure printing or in relief printing or in other suitable processes, such as atomising, spraying, spreading and the like, on paper or other suitable supports.

| Example | Dye preparation | Stock thickener |
|---|---|---|
| 48 | 15 parts according to Example 1 | 85 parts of a 2.5% aqueous solution of weakly alkaline anionic locust bean flour derivative |
| 49 | 15 parts according to Example 20 | 85 parts of a 2% aqueous solution of neutral, non-ionic depolymerised guar flour |
| 50 | 15 parts according to Example 21 | 85 parts of a 2% aqueous solution of neutral, non-ionic, hydroxyethylated carob bean flour |
| 51 | 15 parts according to Example 22 | 85 parts of an oil-in-water emulsion containing 1.5% of locust bean flour ether |
| 52 | 15 parts according to Example 23 | 85 parts of an 8% aqueous solution of non-ionic, neutral locust bean flour ether thickener |
| 53 | 15 parts according to Example 24 | 85 parts of a 2.5% aqueous solution of anionic, alkaline locust bean flour ether thickener |
| 54 | 15 parts according to Example 25 | 85 parts of a 3.5% aqueous solution of a mixture of locust bean flour ether and starch ether |
| 55 | 15 parts according to Example 26 | 85 parts of a 5% aqueous solution of anionic, weakly alkaline starch ether |
| 56 | 15 parts according to Example 27 | 85 parts of a 2% aqueous solution of carboxymethylcellulose |
| 57 | 15 parts according to Example 28 | 85 parts of a 1.25% aqueous solution of hydroxyethylcellulose |
| 58 | 15 parts according to Example 29 | 85 parts of a 0.8% aqueous solution of a high-polymeric polyacrylic acid |
| 59 | 15 parts according to Example 30 | 85 parts of a 6% aqueous solution of a self-crosslinking, thickening polymer paste based on an acrylate |
| 60 | 15 parts according to Example 1 | 85 parts of a 6% aqueous solution of a paste of a copolymer based on maleic acid |
| 61 | 15 parts according to Example 20 | 85 parts of a 6% aqueous solution of locust bean flour ether with colloidal silica |
| 62 | 15 parts according to Example 21 | 85 parts of a 10% aqueous solution of lignin-containing carboxymethylcellulose |
| 63 | 15 parts according to Example 22 | 85 parts of a water-in-oil emulsion containing Na alginate as the protective colloid |

EXAMPLE 64

30 parts of a liquid 40% dyeing preparation formulated according to Example 30 are stirred into 500 parts of a stock thickener of the following composition and homogenised: 15 parts of sodium alginate thickener, 259 parts of water, 1 part of formalin, 150 parts of a 20% aqueous polyvinyl alcohol solution containing 10–17% of polyvinyl acetate as the copolymer component, and 75 parts of a 10% aqueous solution of a wetting and anti-foaming agent (containing nonylphenol diglycol ethersulphate, silicone oil and a solvent).

Finally, the mixture is diluted with water until the viscosity is about 15, measured with a Lefranc fluid meter.

This printing ink is printed onto a suitable paper web at a printing speed of 60 m/minute, using a Saueressig gravure printing machine, and dried.

After hot calendering for 35 seconds at a temperature of 210° C. in contact with a polyester woven or knitted fabric, a print with a strongly reddish intense blue colour of excellent general fastness properties is obtained on this fabric.

EXAMPLE 65

15 parts of the 48% dyeing preparation formulated according to Example 23 are diluted with 15 parts of a 1:1 mixture of desalinated water and denatured ethanol and introduced into 120 parts of a stock thickener of the following composition, with intensive stirring with an impeller: 78 parts of denatured ethanol, 24 parts of water and 3.6 parts of hydroxypropylcellulose dissolved therein, and also 14.4 parts of a 30% aqueous solution of a copolymer based on vinylpyrrolidone.

The resulting rapid-drying aqueous-alcoholic printing ink has a viscosity of 26" (Ford cup No. 4). The printing ink is deflocculated and has very good rheological properties in the printing chassis.

The prints obtained with this printing ink on a paper gravure printing machine with a cylinder engraved for halftone reproduction to a depth of 30 microns are faultless, i.e. they dry rapidly, adhere well and are free from bubbles.

If the printed side of the dried print is placed on a polyester satin fabric and treated for 30 seconds at 210° C. on a sheet press, a sharp-contoured deep yellow print is obtained which has good general fastness properties.

EXAMPLE 66

The procedure described in Example 65 is repeated, except that 30 parts of the preparation formulated according to Example 26, diluted with 10 parts of water and 10 parts of ethanol, are used and this mixture is stirred into 100 parts of the stock thickener. With an otherwise identical procedure, a print on polyester is obtained which has an intense deep purplish red shade having very good wetfastness properties.

EXAMPLE 67

A paper web is printed by the flexographic printing process with a printing ink which consists of 10 parts of the dyestuff preparation obtained according to Example 25, 5 parts of water, 3 parts of a urea-formaldehyde resin, 60 parts of a 15% polyvinylbutyral resin solution in ethyl alcohol and 22 parts of ethyl alcohol.

The dyestuff preparation, prediluted with water, is stirred, with good turbulence, into the mixture, predissolved in ethanol, of urea-formaldehyde resin and polyvinylbutyral and homogenised very carefully.

This flexographic printing ink produces on transfer printing paper a print which is fast to rubbing and which can be transferred in a very high colour yield to a polyester woven or knitted fabric on a calender at a temperature of 200 to 210° within a contact time of 30 to 35 seconds. An intense, reddish orange shade is obtained. The transferred design has very good wearing properties.

EXAMPLE 68

A polyester fabric is printed on a flat screen printing machine with a printing paste containing, per kilogram, 2.4 g of the dye of the formula

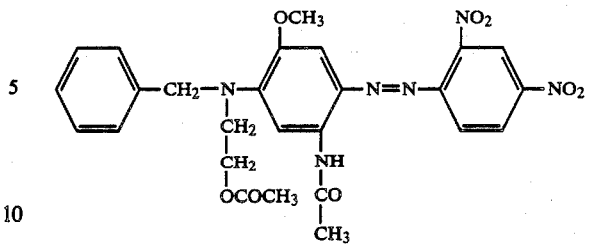

7.2 g of the dye of the formula

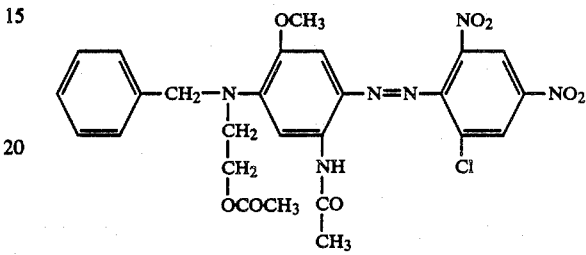

1 g of the non-ionic polycondensation product of Example 1, 0.4 g of the ligninsulphonate of Example 2, 6 g of monopropylene glycol,
3.75 g of a branched carboxypolymethylene polymer with a molecular weight of about 4,000,000,
1.25 g of a linear carboxypolymethylene polymer with a molecular weight of about 1000,000 and
978 g of water.

The fabric is subsequently predried at 100° C. and the dried fabric is fixed for 8 minutes in an atmosphere of superheated steam of 180° C. After the fixation, the textile web is washed three times for 2 minutes at 20°–25° C. with tetrachloroethylene. The small amount of non-fixed dye can be rapidly removed from the fabric owing to its good solubility in tetrachloroethlene. After drying, a deep navy blue printed fabric with good fastness to rubbing and good wetfastness properties, a soft handle and a good white ground is obtained.

A printing paste containing electrolytic disperse dyes (conventional dyestuff formulations), natural thickeners and water yields a dull print which is not fast to rubbing after the washing procedure described above. The resulting print is defective.

EXAMPLE 69

A print which is fast to rubting, wetfast, and having a soft handle and a good white ground is obtained by repeating the procedure described in Example 68, but printing on a roller or rotary film printing machine instead of on a flat screen printing machine.

EXAMPLE 70

A green print which is fast to rubbing, wetfast, and having a soft handle and a good white ground is obtained by repeating the procedure described in Example 68, but using the yellow dye of Example 21 and the blue dye of Example 32 as disperse dyes.

EXAMPLE 71

Similarly good results are obtained by repeating the procedure of Example 68, but fixing the prints by means of a hot air treatment for 1 minute at 200° C. or a steam treatment under pressure for 20 minutes at 2 bar (132° C.).

EXAMPLE 72

A polyester fabric is printed on a flat screen printing machine with a printing paste containing, per kilogram, 6 g of the dye of the formula

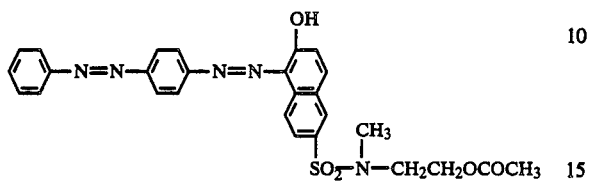

0.6 g of the non-ionic polycondensation product of Example 1, 0.3 g of the ligninsulphonate of Example 2, 4 g of monopropylene glycol,
3.75 g of the branched polymer of Example 68,
1.25 g of the linear polymer of Example 68, and
984. 1 of water.

The fabric is subsequently predried at 100° C. and fixed for 8 minutes in a superheated steam atmosphere of 180° C. After the fixation, the textile web is washed in a washing machine
(a) once for 5 seconds with pure trichloroethylene at 20°–25° C.,
(b) once for 2 minutes with tetrachloroethylene which contains 2 g/l of the compound of the formula $$\left[\begin{array}{c} C_{12}H_{25} \\ \phantom{C_{12}H_{25}} \diagdown \\ \phantom{C_{12}H_{25}} N-CH_3 \\ \phantom{C_{12}H_{25}} \diagup \\ C_{12}H_{25} \end{array} \begin{array}{c} CH_3 \end{array}\right]^{\oplus} Cl^{\ominus}$$

at 20°–25° C., and
(c) once for 5 seconds with pure tetrachloroethylene at 20°–25° C.

Non-fixed dye can be rapidly removed from the fabric. After drying, a fabric printed in a deep red shade of good fastness properties is obtained.

EXAMPLE 73 to 78

A printed fabric with similarly good fastness properties is obtained by repeating the procedure described in Example 72, but using for the second washing-off a liquor which contains 2 g/l of the following assistants:

| Example | |
|---|---|
| 73 | 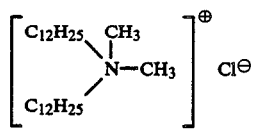 <br> C<sub>16</sub> (palmityl): 29% <br> C<sub>18</sub> (stearyl): 23% <br> C<sub>18</sub> (oleyl): 37% |
| 74 | $\left[\begin{array}{c} CH_3 \\ R'-N-CH_2-\text{Ph} \\ CH_3 \end{array}\right]^{\oplus} Cl^{\ominus}$ <br> R' = C<sub>18</sub> (oleyl): 76% |
| 75 | $\begin{array}{c} CH_3 \\ | \\ H_3CO-P=O \\ | \\ OCH_3 \end{array}$ |
| 76 | $\begin{array}{c} (CH_3)_2N \\ \diagdown \\ (CH_3)_2N-P=O \\ \diagup \\ (CH_3)_2N \end{array}$ |
| 77 | $\left[\begin{array}{c} CH_3 \\ | \\ C_{22}H_{45}-N-CH_2-\text{Ph} \\ | \\ CH_3 \end{array}\right]^{\oplus} Cl^{\ominus}$ |
| 78 | $\left[\begin{array}{c} CH_3 \\ | \\ R''-N-CH_2-\text{Ph} \\ | \\ CH_3 \end{array}\right]^{\oplus} Cl^{\ominus}$ <br> R'' = coconut fat |

EXAMPLE 79

300 parts of the fluorescent whitening agent of the formula

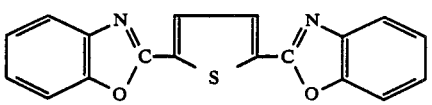

are stirred in a solution of 20 parts of the anionic dispersant of the formula

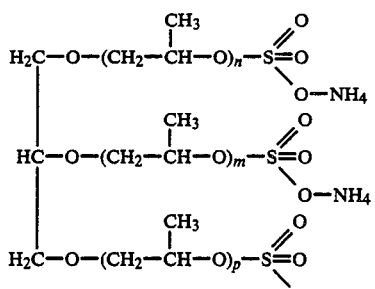

(n + m + p = c,50)

and 30 parts of the non-ionin dispersant of Example 1 in a mixture of 170 parts of monopropylene glycol, 470 parts of water and 120 parts of 37% formaldehyde, and ground for about 4 hours in a closed stirred ball mill using 1 mm glass beads. A dispersion with a particle size of less than 3μ is obtained. If desired, an antifoam is added. After discharging the mill, a preparation of very low viscosity is obtained (<100 cp./20° C.). It is therefore advisable to increase the viscosity to 500–800 cp by addition of 1 to 3 parts of xanthane gum or polyvinyl alcohol. Precipitation of particles even after a storage time of several months is thereby almost completely prevented.

EXAMPLES 80 to 83

Stable, free-flowing, aqueous fluorescent whitening agent suspensions are likewise obtained by repeating the procedure described in Example 79, but using equal parts of the components listed in the following table instead of the indicated fluorescent whitening agent. The active substance content of these dispersions and the respective grinding time is determined by the texture of the crystalline fluorescent whitening agent, the type of mill and the nature of the grinding elements and is between 25 and 50% by weight and 3 to 15 hours respectively.

EXAMPLE 84

500 parts of a dried yellow vat dye of the formula 14 days at 60° C. the viscosity is still not more than 2400 cp and the filtering properties remain unchanged (filtration through a Schleicher and Schüll filter No. 597), which is an indication of an excellent dispersion stability.

When stirred into textile printing thickeners and printed on cellulose fibres, this liquid commercial formulation produces speck-free prints.

EXAMPLE 85

675 parts of the dark blue vat dye of the formula

| Example | fluorescent whitening agent constitution: | anionic dispersant | non-ionic dispersant |
|---|---|---|---|
| 80 | H₃C—benzoxazole—C—CH=CH—C—benzoxazole—CH₃ | as Example 79 | as Example 42 |
| 81 | CH₂—N(piperazine)N—SO₂—C₆H₄—N=N—C(...)—C₆H₄—Cl with CH₂CH₂OH | as Example 79 | as Example 43 |
| 82 | biphenyl—CH=CH—C₆H₄—C(benzoxazole-5,7-diCH₃) | as Example 40 | as Example 1 |
| 83 | benzimidazole—C—CH=(furan)=CH—C—benzimidazole | as Example 41 | as Example 1 |

EXAMPLE 84

500 parts of a dried yellow vat dye of the formula

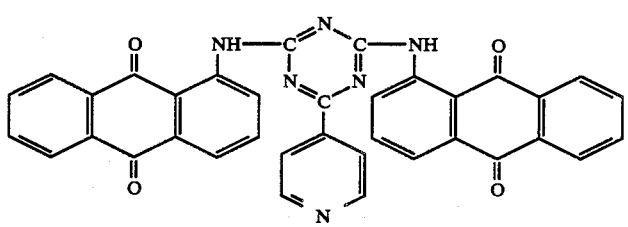

are stirred into a solution containing 300 parts of water, 150 parts of glycerol, 30 parts of the non-ionic dispersant of Example 1 and 20 parts of the anionic dispersant of Example 41, and the liquid slurry is ground in a stirred mill with 1 mm glass beads to a primary particle size which in the main is substantially less than 2μ, whilst only individual particles have a size larger than 5μ. Grinding time: 20 hours.

The deaerated suspension, which has been separated from the grinding elements, is liquid. After storage for in the form of a 37% filter cake with a low electrolyte content, are stirred in a solution consisting of 95 parts of water, 170 parts of 1,2-propylene glycol, 30 parts of the non-ionic dispersant of Example 1 and 30 parts of an anionic dispersant consisting of the triethanolamine salt of a sulphonated polychloromethyl diphenyl, prepared according to German Offenlegungsschrift No. 23,53,691, with a dissolver disc until a slurry of low viscosity is obtained. This slurry is subsequently ground in a stirred mill with 300 parts of zirconium oxide grinding elements (diameter: approx. 2 mm) until the bulk of the pigment particles have a primary particle size of less than 5μ. The grinding stock is separated from the grinding elements, treated if necessary with 1 to 2 parts of an antifoam, and deaerated. The dispersion is low viscosity and can be adjusted with 0.1 to 0.2% of xanthane gum to a viscosity between 500 and 1000 cp. It can be stored for months without any significant change in viscosity, virtually without formation of sediment, and retaining the good filtering properties.

The resulting dyestuff preparation is particularly suitable for the production of aqueous printing inks for textile printing on cellulose fibres.

EXAMPLE 86

In accordance with the preceding Example, 560 parts of the blue vat dye of the formula

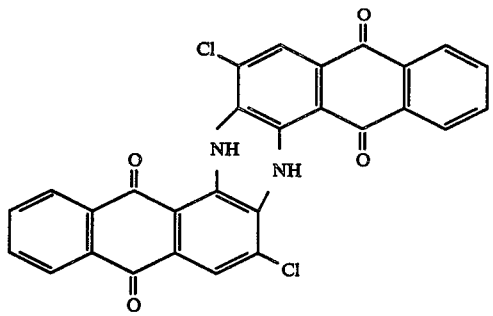

in the form of a 44.6% filter cake with a low electrolyte content, is stirred in a solution consisting of 210 parts of water, 170 parts of 1,2-propylene glycol, 30 parts of the non-ionic dispersant of Example 1 and 30 parts of the anionic dispersant of Example 85, and the resulting slurry is ground. After addition of an antifoam, the isolated grinding stock is deaerated and adjusted with xanthane gum to a viscosity of 500 to 100 cp, yielding a liquid, stable suspension having outstanding applicatory properties in textile printing.

A similar stable liquid formulation which retains its excellent filtering properties for months is obtained by using the sodium salt instead of the triethanolamine salt as anionic dispersant.

EXAMPLE 87

250 parts of the green vat dye of the formula

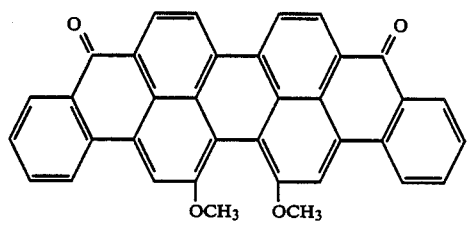

in the form of the dried crude dye with a low electrolyte content, are stirred in a solution consisting of 520 parts of water, 170 parts of 1,2-propylene glycol and 30 parts of the non-ionic and anionic dispersant respectively of Example 85. The resulting slurry is ground for 15 hours in a stirred mill with 300 parts of zirkonium oxide grinding elements. After this time, the degree of grinding corresponds approximately to that of Example 85. The separated and deaerated grinding stock is of very low viscosity. It is thickened with 1 to 2 parts of xanthane gum to produce a stable, freeflowing commercial formulation which retains its exellent filtering properties (filtration through a Schleicher and Schüll filter No. 597) even after storage for several months.

EXAMPLE 88

The procedure of Example 87 is repeated, but using 300 parts of the violet indigo dye of the formula

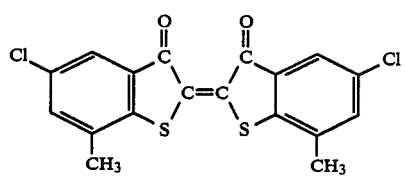

instead of 250 parts of the green anthraquinoid dye, while simultaneously reducing the amount of water from 520 parts to 470 parts. After separating the grinding elements, a liquid free-flowing commercial formulation of excellent stability is likewise obtained.

EXAMPLE 89

Stable suspensions of low viscosity are also obtained by stirring 450 parts of the blue disperse dye of Example 1 in a solution consisting of 25 parts of the non-ionic dispersant of Example 1 and 5 parts of the anionic dispersant of the general formula

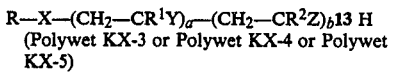
(Polywet KX-3 or Polywet KX-4 or Polywet KX-5)

in 170 parts of 1,2-propylene glycol, 2 parts of the preservative of Example 1 and 348 parts of water, and otherwise repeating the procedure described in Example

EXAMPLE 90

Stable suspensions of low viscosity are also obtained by stirring 50 parts of the red disperse dye of Example 24 in a solution consisting of 2.5 parts of the non-ionic dispersant of Example 1 and 0.5 part of the anionic dispersant of the general formula

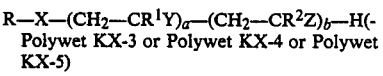
Polywet KX-3 or Polywet KX-4 or Polywet KX-5)

in 170 parts of 1,2-polypropylene glycol, 2 parts of the preservative of Example 1 and 348 parts of water, and otherwise repeating the procedure of Example 24.

EXAMPLE 91

A dyestuff preparation which is also very suitable for printing in accordance with t:he procedure described in Examples 45 and 46 is that: containing 41.5% of the violet dye of the formula

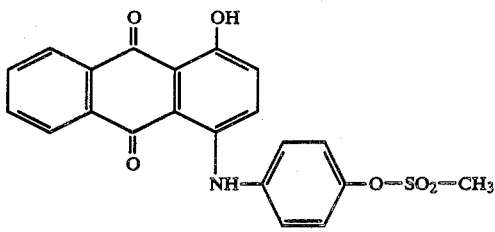

17.8% of 1,2-propylene glycol,
3% of the non-ionic polycondensation product of Example 1,
1.6% of the ligninsulphonate of Example 2,
0.8% of bactericide,
0% of thickener,
0.3% of antifoam, and 35% of water.

EXAMPLE 92

A dyestuff preparation which is also very suitable for printing in accordance with the procedure described in Examples 45 and 46 is that containing
42.4% of the yellow dye of the formula

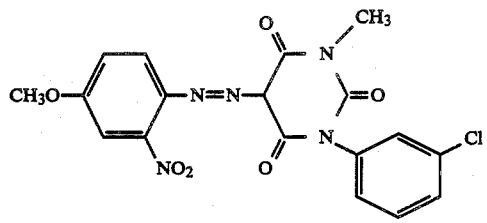

17% of 1,2-propylene glycol,
3% of the non-ionic polycondensation product of Example 1,
2% of the ligninsulphonate of Example 2,
0.9% of bactericide,
0.2% of antifoam, and
34.5% of water.

EXAMPLE 93

A dyestuff preparation which is also very suitable for printing in accordance with the procedure described in Examples 45 and 46 is that containing
36.7% of the yellow dye of the formula

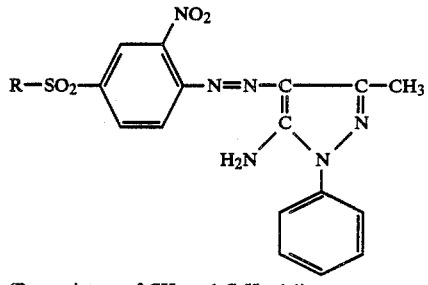

(R = mixture of CH₃ and C₂H₅, 1:1)

20.4% of 1,2-propylene glycol,
3.1% of the non-ionic polycondensation product of Example 1,
2% of the ligninsulphonate of Example 2,
0.8% of bactericide,
0.2% of antifoam, and
36.8% of water.

EXAMPLE 94

A dyestuff preparation which is also very suitable for printing in accordance with the procedure described in Examples 45 and 46 is that containing
33.8% of the navy blue dye of the formula mixture of 1:3

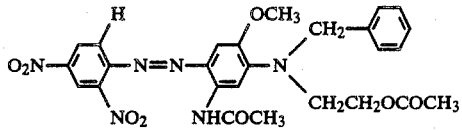

and

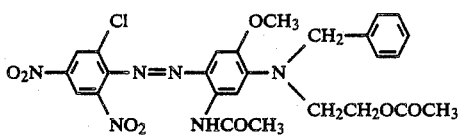

20% of 1,2-propylene glycol,
3.5% of the non-ionic polycondensation product of Example 1,
1.3% of the ligninsulphonate of Example 2,
0.2% of sodium hexametaphosphate,
0.8% of bactericide,
0.2% of antifoam,
0.2% of thickener, and
38% of water.

EXAMPLE 95

A dyestuff preparation which is also very suitable for printing in accordance with the procedure described in Examples 45 and 46 is that containing 35% of the pink dye of the formula

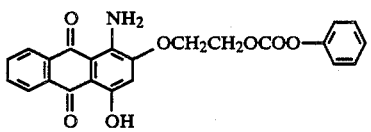

20% of 1,2-polypropylene glycol,
3% of the non-ionic polycondensation product of Example 1,
1.5% of the ligninsulphonate of Example 2,
0.7% of bactericide,
0.2% of antifoam, and
39.6% of water.

EXAMPLE 96

A dyestuff preparation which is also very suitable for printing in accordance with the procedure described in Examples 45 and 46 is that containing
30% of the red dye of the formula

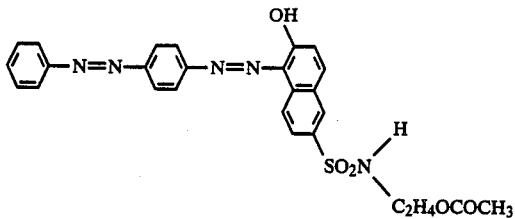

21% of 1,2-polypropylene glycol,
3% of the non-ionic polycondensation product of Example 1,
1.5% of the ligninsulphonate of Example 2,
0.7% of bactericide,
0.2% of antifoam, and
43.6% of water.

EXAMPLE 97

A dyestuff preparation which is also very suitable for printing in accordance with the procedure described in Examples 45 and 46 is that containing
27% of the yellow dye of the formula

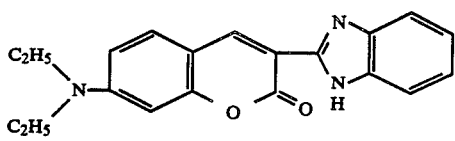

22.2% of 1,2-polypropylene glycol,
3% of the non-ionic polycondensation product of Example 1,
2% of the ligninsulphonate of Example 2,
0.9% of bactericide,
0.5% of antifoam, and
44.4% of water.

EXAMPLE 98

A dyestuff preparation which is also very suitable for printing in accordance with the procedure described in Examples 45 and 46 is that containing
21.6% of the dye of Example 97,
17.8% of 1,2-propylene glycol,
2.4% of the non-ionic polycondensation product of Example 1,
1.6% of the ligninsulphonate of Example 2,
0.7% of bactericide
0.4% of antifoam, and
55.5% of water.

EXAMPLE 99

A dyestuff preparation which is also very suitable for printing in accordance with the procedure described in Examples 45 and 46is that containing
6.2% of the dye of Example 97,
3.3% of 1,2-propylene glycol,
1.8% of the non-ionic polycondensation product of Example 1,
1.2% of the ligninsulphonate of Example 2,
0.5% of bactericide,
0.2% of antifoam, and
6.8% of water.

EXAMPLE 100

A dyestuff preparation which is also very suitable for printing in accordance with the procedure described in Examples 45 and 46 is that containing
10.8% of the dye of Example 97,
8.9% of 1,2-polypropylene glycol,
1.2% of the non-ionic polycondensation product of Example 1,
0.8% of the ligninsulphonate of Example 2,
0.4% of bactericide,
0.2% of antifoam, and
7.7% of water.

EXAMPLE 101

A dyestuff preparation which is also very suitable for printing in accordance with the procedure described in Examples 45 and 46 is that containing
38.2% of the scarlet dye of the formula

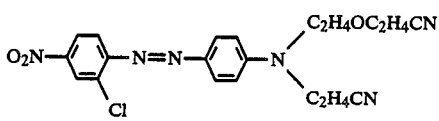

18.3% of 1,2-polypropylene glycol,
3% of the non-ionic polycondensation product of Example 1,
2% of the ligninsulphonate of Example 2,
0.9% of bactericide,
0.2% of thickener (carboxymethyl cellulose),
0.1% of antifoam, and
37.3% of water.

EXAMPLE 102

A dyestuff preparation which is also very suitable for printing in accordance with the procedure described in Examples 45 and 46 is that containing
38.9% of yellow dye of the formula

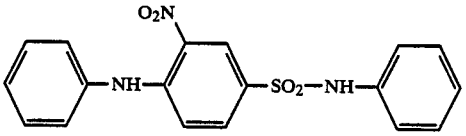

18.6% of 1,2-propylene glycol,
3% of the non-ionic polycondensation product of Example 1,
2% of the ligninsulphonate of Example 2,
0.5% of antifoam,
0.2% of bactericide, and
36.8% of water.

EXAMPLE 103

A dyestuff preparation which is also very suitable for printing in accordance with the procedure described in Examples 45 and 46 is that containing
41% of the orange dye of the formula

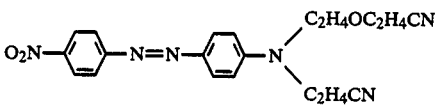

17.5% of 1,2-propylene glycol,

3% of the non-ionic polycondensation product of Example 1,
2% of the ligninsulphonate of Example 2,
0.9% of bactericide,
0.5% of antifoam, and
35.1% of water.

EXAMPLE 104

A dyestuff preparation which is also very suitable for printing in accordance with the procedure described in Examples 45 and 46 is that containing
26.3% of the blue dye of the formula

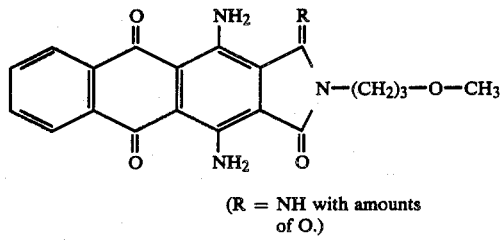

(R = NH with amounts of O.)

22.4% of 1,2-polypropylene glycol,
3% of the non-ionic polycondensation product of Example 1,
2% of the ligninsulphonate of Example 2,
0.9% of bactericide,
0.5% of antifoam, and
44.9% of water.

What is claimed is:

1. An aqueous dyestuff preparation of a water-insoluble or sparingly water-soluble dye having a particle size of less than 10μ which contains at least 10% by weight of water, 10 to 60% by weight, of a finely dispersed water-insoluble or sparingly water-soluble dye, 0.1 to 5% by weight of a ligninsulphonate and 0.5 to 5% by weight of a non-ionic copolymer of ethylene oxide and propylene oxide, said copolymer having an ethylene oxide content of at least 65% by weight and a molecular weight of more than 12,000.

2. A dyestuff preparation according to claim 1, wherein contains 0.5 to 2% by weight of liguinsulphonate and 1 to 3% by weight of a copolymer of ethylene oxide and propylene oxide.

3. A dyestuff preparation according to claim 1, which contains 35 to 50% by weight of a water-insoluble or sparingly water-soluble dye.

4. A dyestuff preparation according to claim 1, which contsins a disperse dye or vat dye as water-insoluble or sparingly water-soluble dye.

5. A dyestuff preparation according to claim 1, wherein the dye particle size is less than 2μ.

6. A dyestuff preparation according to claim 1, which contains a ligninsulphonate with an average molecular weight of between 1,000 and 80,000 and an active ligninsulphonate content of at least 80% and a ratio of carbon to organically bonded sulphur of 9:1 to 55:1.

7. A dyestuff preparation according to claim 6, which contains a kraft-ligninsulphonate in which 80% of the molecules have a molecular weight between 6,000 and 50,000 and in which the ratio of carbon to organically bonded sulphur is about 33:1.

8. A dyestuff preparation according to claim 6, which contains a sulphite-ligninsulphonate in which 80% of the molecules have a molecular weight between 10,000 and 50,000 and in which the ratio of carbon to organically bonded sulphur is about 24.5:1.

9. A dyestuff preparation according to claim 6, which contains a sulphite-ligninsulphonate in which 10% of the molecules have a molecular weight below 10,000, 25% have a molecular weight between 10000 and 40,000 and 65% have a molecular weight above 40,000 and in which the ratio of carbon to organically bonded sulphur is about 23:1.

10. A dyestuff preparation according to claim 6, which contains a kraft-ligninsulphonate in which 80% of the molecules have a molecular weight between 2,000 and 30,000, and in which the ratio of carbon to organically bonded sulphur is about 46:1.

11. A dyestuff preparatior according to claim 6, which contains a mixture of kraft- and sulphite-ligninsulphonates in which 15-20% of the molecules have a molecular weight below 10,000, 33-45% have a molecular weight between 10,000 and 30,000 and 35-52% have a molecular weight above 30,000.

12. A dyestuff preparation according to claim 1, wherein the copolymer has an ethylene oxide content of at loast 80%.

13. A dyestuff preparation according to claim 1, which contains a copolymer of ethylene oxide and propylene oxide of the formula

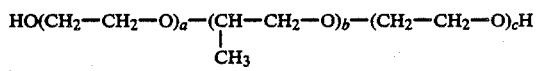

in which the sum of a and c is a number of at least 150, and b is a number between 20 and 100.

14. A dyestuff preparation according to claim 13, wherein the sum of a+c is a number from 200 to 225 and b is a number from 60 to 80.

15. A dyestuff preparation according to claim 13, wherein the sum of a+c is a number from 280 to 320 and b is a number from 50 to 60.

16. A dyestuff preparation according to claim 13, wherein the sum of a+c is a number from 220 to 280 and b is a number from 40 to 55.

17. A dyestuff preparation according to claim 1, which contains a further ingredient selected from the group consisting of hygroscopic agents, antifrost agents, antimicrobial agents, fungicides, antifoams, viscosity improvers and complexing agents.

18. A dyestuff preparation according to claim 17, which contains a polyphosphate as a complexing agent.

19. A dyestuff preparation according to claim 18, which contains 0.1 to 5% by weight of a polyphosphate.

20. A dyestuff preparation according to claim 1, which contains at least 20% by weight of water, 25 to 60% by weight of a disperse or vat dye, 0.1 to 5% by weight of a ligninsulphonate, and 0.5 to 5% by weight of a copolymer of ethylene oxide and propylene oxide with an ethylene oxide content of at least 65% by weight.

21. A dyestuff preparation according to claim 20, wherein the dye content is 35 to 50% by weight, the ligninsulphonate content is 0.5 to 2% by weight, and the copolymer content is 1 to 3% by weight.

22. A dyestuff preparation according to either of claims 20 or 21, further containing 0.1 to 5% by weight of a polyphosphate.

23. A dyestuff preparation according to claim 1, which contains the ligninsulphonate in an amount of 2 to 10% by weight, based on the amount of dye.

24. A dyestuff preparation according to claim 1, which contains the non-ionic copolymer in an amount of 3 to 15% by weight, based on the amount of dye.

25. A dyestuff preparation according to claim 1, which contains 35 to 45% of the violet dye of the formula

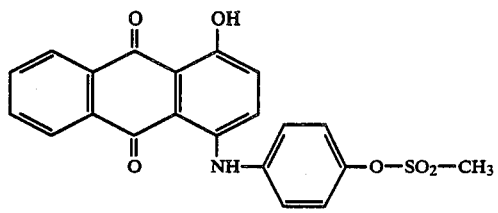

15 to 25% of propylene glycol, 2 to 5% of a non-ionic polycondensation product of about 20% of propylene oxide and about 80% of ethylene oxide with a molecular weight of about 16,500, 1 to 3% of a sulphonated fractionated ligninsulphonate having a ratio of carbon to organically bonded sulphur of about 33:1 and which consists of 80% of molecules with a molecular weight between 6000 and 50,000, 0.5 to 1% of a bactericide, 0.1 to 0.5% of an antifoam, and 30 to 40% of water.

26. A dyestuff preparation according to claim 1, which contains 35 to 50% of the yellow dye of the formula

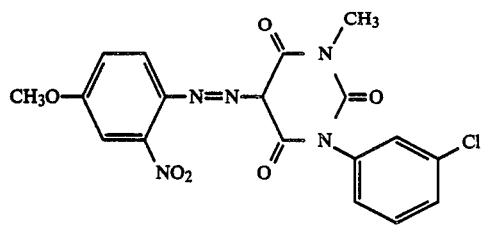

15 to 25% of propylene glycol, 2 to 5% of a non-ionic polycondensation product of about 20% of propylene oxide and about 80% of ethylene oxide with a molecular weight of about 16,500, 1 to 3% of a sulphonated fractionated ligninsulphonate having a ratio of carbon to organically bonded sulphur of about 33:1 and which consists of 80% of molecules with a molecular weight between 6000 and 50,000, 0.5 to 1% of a bacteracide, 0.1 to 0.5% of an antifoam, and 30 to 40% of water.

27. A dyestuff preparation according to claim 1, which contains 30 to 40% of the yellow dye of the formula

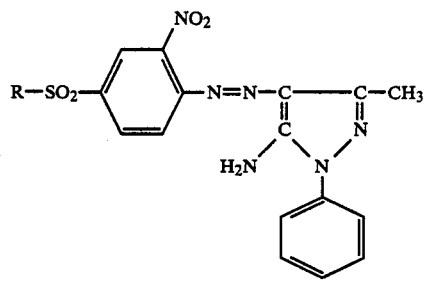

(R = mixture of CH$_3$ and C$_2$H$_5$, 1:1)

15 to 25% of propylene glycol, 2 to 5% of a non-ionic polycondensation product of about 20% of propylene oxide and about 80% of ethylene oxide with a molecular weight of about 16,500, 1 to 3% of a sulphonated fractionated ligninsulphonate having a ratio of carbon to organically bonded sulphur of about 33:1 and which consists of 80% of molecules with a molecular weight between 6000 and 50,000, 0.5 to 1% of a bactericide, 0.1 to 0.5% of an antifoam, and 30 to 40% of water.

28. A dyestuff preparation according to claim 1, which contains 30 to 40% of the navy blue dye of the formula mixture of 1:3

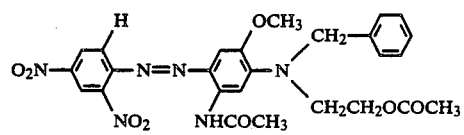

and

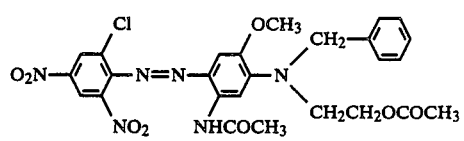

15 to 25% of propylene glyccl, 2 to 5% of a non-ionic polycondensation product of about 20% of propylene oxide and about 80% of ethylene oxide with a molecular weight of about 16,500, 1 to 3% of a sulphonated fractionated ligninsulphonate having a ratio of carbon to organically bonded sulphur of about 33:1 and which consists of 80% of molecules with a molecular weight between 6000 and 50,000, 0.5 to 1% of a bactericide, 0.1 to 0.5% of an antifoam, and 30 to 45% of water.

29. A dyestuff preparation according to claim 1, which contains 30 to 40% of the pink dye of the formula

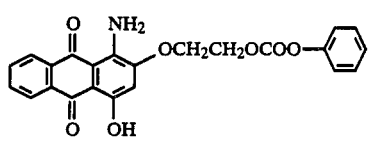

15 to 25% of propylene glycol, 2 to 5% of a non-ionic polycondensation product of about 20% of propylene oxide and about 80% of ethylene oxide with a molecular weight of about 16,500, 1 to 3% of a sulphonated fractionated ligninsulphonate having a ratio of carbon to organically bonded sulphur of about 33:1 and which consists of 80% of molecules with a molecular weight between 6000 and 50,000, 0.5 to 1% of a bactericide, 0.1 to 0.5% of an antifoam, and 30 to 45% of water.

30. A dyestuff preparation according to claim 1 which contains 25 to 35% of the red dye of the formula

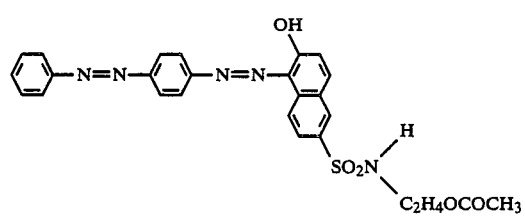

15 to 25% of propylene glycol, 2 to 5% of a non-ionic polycondensation product of about 20% of propylene oxide and about 80% of ethylene oxide with a molecular weight of about 16,500, 1 to 3% of a sulphonated fractionated ligninsulphonate having a ratio of carbon to organically bonded sulphur of about 33:1 and which consists of 80% of molecules with a molecular weight between 6000 and 50,000, 0.5 to 1% of a bactericide, 0.1 to 0.5% of an antifoam, and 40 to 50% of water.

31. A dyestuff preparation according to claim 1, which contains 20 to 30% of the yellow dye of the formula

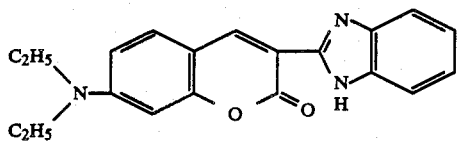

15 to 25% of propylene glycol, 2 to 5% of a non-ionic polycondensation product of about 20% of propylene oxide and about 80% of ethylene oxide with a molecular weight of about 16,500, 1 to 3% of a sulphonated fractionated ligninsulphonate having a ratio of carbon to organically bonded sulphur of about 33:1 and which consists of 80% of molecules with a molecular weight between 6000 and 50,000, 0.5 to 1% of a bactericide, 0.1 to 0.5% of an antifoam, and 40 to 60% of water.

32. A dyestuff preparation according to claim 1, which contains 10 to 20% of the yellow dye of the formula

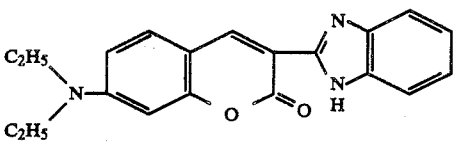

5 to 15% of propylene glycol, 1 to 3% of a non-ionic polycondensation product of about 20% of propylene oxide and about 80% of ethylene oxide and having a molecular weight of about 16,500, 0.5 to 2% of a sulphonated fractionated kraft-lignin with a ratio of carbon to organically bonded sulphur of about 33:1 and consisting of 80% of molecules having a molecular weight between 6000 and 50,000, 0.3 to 0.6% of a bactericide, 0.1 to 0.5% of an antifoam and 60 to 80% of water.

33. A dyestuff preparation according to claim 1, which contains 35 to 40% of the scarlet dye of the formula

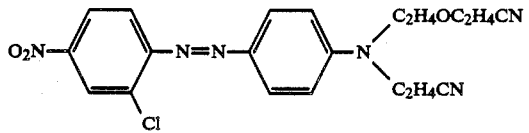

15 to 25% of propylene glycol, 2 to 5% of a non-ionic polycondensation product of about 20% of propylene oxide and about 80% of ethylene oxide with a molecular weight of about 16,500, 1 to 3% of a sulphonated fractionated ligninsulphonate having a ratio of carbon to organically bonded sulphur of about 33:1 and which consists of 80% of molecules with a molecular weight between 6000 and 50,000, 0.5 to 1% of a bactericide, 0.1 to 0.5% of an antifoam, and 30 to 40% of water.

34. A dyestuff preparation according to claim 1, which contains 35 to 40% of the dye of the formula

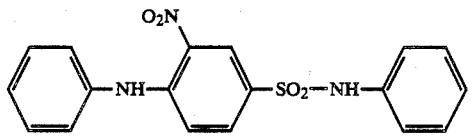

15 to 25% of propylene glycol, 2 to 5% of a non-ionic polycondensation product of about 20% of propylene oxide and about 80% of ethylene oxide with a molecular weight of about 16,500, 1 to 3% of a sulphonated fractionated ligninsulphonate having a ratio of carbon to organically bonded sulphur of about 33:1 and which consists of 80% of molecules with a molecular weight between 6000 and 50,000, 0.5 to 1% of a bactericide, 0.1 to 0.5% of an antifoam, and 30 to 40% of water.

35. A dyestuff preparation according to claim 1, which contains 40 to 45% of the orange dye of the formula

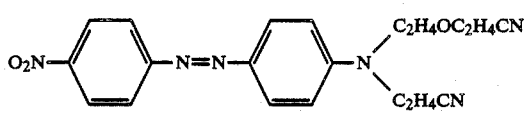

15 to 25% of propylene glycol, 2 to 5% of a non-ionic polycondensation product of about 20% of propylene oxide and about 80% of ethylene oxide with a molecular weight of about 16,500, 1 to 3% of a sulphonated fractionated ligninsulphonate having a ratio of carbon to organically bonded sulphur of about 33:1 and which consists of 80% of molecules with a molecular weight between 6000 and 50,000, 0.5 to 1% of a bactericide, 0.1 to 0.5% of an antifoam, and 30 to 40% of water.

36. A dyestuff preparation according to claim 1, which contains 25 to 30% of the blue dye of the formula

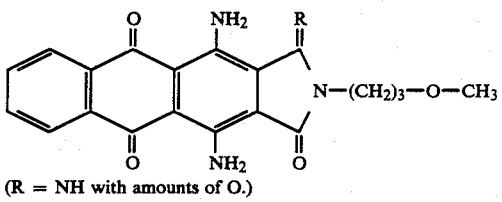

(R = NH with amounts of O.)

15 to 25% of propylene glycol, 2 to 5% of a non-ionic polycondensation producr of about 20% of propylene oxide and about 80% of ethylene oxide with a molecular weight of about 16,500, 1 to 3% of a sulphonated fractionated ligninsulphonate having a ratio of carbon to organically bonded sulphur of about 33:1 and which consists of 80% of molecules with a molecular weight between 6000 and 50,000, 0.5 to 1% of a bactericide, 0.1 to 0.5% of an antifoam, and 40 to 50% of water.

37. A process for the production of an aqueous dyestuff preparation according to claim 1, which comprises grinding the indicated dye in water with the addition of the ligninsulphonate or the copolymer and adding the remaining components before, during or after the grinding process, to produce a preparation which has a particle size of less than 10μ.

38. A method of preparing printing pastes on an aqueous, organic or aqueous-organic basis or based on a water-in-oil emulsion, which comprises the use of an aqueous dye preparation according to claim 1.

39. A printing paste obtained according to claim 38.

40. A printing paste according to claim 40 which contains a polyacrylic thickener as thickener.

41. A method of printing textile material, which comprises the use of a printing paste obtained according to claim 38.

42. A method of printing transfer print supports, using dyes suitable in transfer printing, which comprises the use of a printing paste obtained according to claim 38.

43. A method of producing dye liquors or printing pastes for dyeing or printing synthetic textile material, which comprises the use of an aqueous dyestuff preparation according to claim 1.

44. A printed transfer print support obtained according to claim 42.

45. A printing paste according to claim 38, which contains, as a thickener, a mixture of a branched and linear carboxypolymethylene polymer.

46. A printing paste according to claim 45, wherein the branched carboxypolymethylene polymer has a molecular weight of about 4,000,000, and the linear carboxypolymethylene polymer a molecular weight of about 1,000,000.

* * * * *